US009697089B2

(12) United States Patent
Awazu et al.

(10) Patent No.: US 9,697,089 B2
(45) Date of Patent: Jul. 4, 2017

(54) BACKUP METHOD AND STORAGE MEDIUM HAVING BACKUP PROGRAM STORED THEREIN

(75) Inventors: Hironobu Awazu, Kawasaki (JP); Yuzuru Ueda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1421 days.

(21) Appl. No.: 13/426,727

(22) Filed: Mar. 22, 2012

(65) Prior Publication Data

US 2012/0278286 A1    Nov. 1, 2012

(30) Foreign Application Priority Data

Apr. 27, 2011    (JP) .................................. 2011-100092

(51) Int. Cl.
| G06F 7/00 | (2006.01) |
| G06F 17/00 | (2006.01) |
| G06F 11/14 | (2006.01) |
| G06F 11/34 | (2006.01) |

(52) U.S. Cl.
CPC ...... *G06F 11/1453* (2013.01); *G06F 11/1451* (2013.01); *G06F 11/1461* (2013.01); *G06F 11/1464* (2013.01); *G06F 11/3409* (2013.01)

(58) Field of Classification Search
None
See application file for complete search history.

(56) References Cited

U.S. PATENT DOCUMENTS

| 5,787,262 A * | 7/1998 | Shakib et al. ................ 709/205 |
| 7,043,503 B2 * | 5/2006 | Haskin ................ G06F 11/1435 |
| 2003/0191743 A1 * | 10/2003 | Brodersen ......... G06F 17/30174 |
| 2004/0030728 A1 * | 2/2004 | Ishmael et al. ............... 707/200 |
| 2007/0282925 A1 | 12/2007 | Son et al. |
| 2008/0016387 A1 * | 1/2008 | Bensinger ........... G06F 11/1456 714/4.11 |
| 2009/0203389 A1 * | 8/2009 | Bhat ............................. 455/466 |
| 2009/0249005 A1 * | 10/2009 | Bender et al. ................ 711/162 |
| 2010/0262959 A1 * | 10/2010 | Bruno et al. .................. 717/171 |
| 2011/0131278 A1 * | 6/2011 | Nieh et al. .................... 709/204 |

FOREIGN PATENT DOCUMENTS

| JP | 2003-186765 | 7/2003 |
| WO | WO-2005/093579 | 10/2005 |

* cited by examiner

*Primary Examiner* — Jau-Shya Meng
(74) *Attorney, Agent, or Firm* — Fujitsu Patent Center

(57) ABSTRACT

A backup method for a backup system including an information processing apparatus and two or more information processing devices connected via a network includes, when the information processing device is designated as a first device among a plurality of the information processing devices, transmitting a first backup image of the first device to the information processing apparatus and transmitting the first backup image to a second device, and when the information processing device is the second device, extracting a difference image, which is a difference between the first backup image transmitted from the first device and a second backup image of the second device and transmitting the difference image to the information processing apparatus.

4 Claims, 28 Drawing Sheets

~13

| GROUP NUMBER | MULTICAST ADDRESS | BASIC IMAGE NAME |
|---|---|---|
| 1 | 225.0.0.1 | BASIC IMAGE1 |
| 2 | 225.0.0.2 | BASIC IMAGE2 |
| 3 | 225.0.0.3 | BASIC IMAGE3 |
| 4 | 225.0.0.4 | BASIC IMAGE4 |
| 5 | 225.0.0.5 | BASIC IMAGE5 |
| 6 | 225.0.0.6 | BASIC IMAGE6 |
| ... | ... | ... |

31, 32, 33

F I G. 3

~14

| INFORMATION PROCESSING DEVICE NUMBER | GROUP NUMBER | DIFFERENCE IMAGE NAME |
|---|---|---|
| 1 | 5 | DIFFERENCE IMAGE1 |
| 2 | 5 | DIFFERENCE IMAGE2 |
| 3 | 5 | |
| 4 | 5 | DIFFERENCE IMAGE3 |
| ... | ... | ... |

41, 42, 43

F I G. 4

F I G. 10

| MODEL NAME | CPU | MEMORY CAPACITY | HARD DISK CAPACITY | LAN DRIVER | ... |
|---|---|---|---|---|---|
| D53X | CPUXX1 | 2 GB | 160 GB | AXXXX | ... |
| D54X | CPUXX5 | 2 GB | 160 GB | BXXXX | ... |
| E76X | CPUXX6 | 1 GB | 160 GB | DXXXX | ... |
| FMV-XXX | CPUXXX 1.7GHz | 128 MB | 40 GB/80 GB | FXXXX | ... |

FIG. 11

| FILE ATTRIBUTE INFORMATION (91) | | INFORMATION PROCESSING DEVICE NAME (MEMBER) (92) | | | | | | NUMBER OF POSSESSING INFORMATION PROCESSING DEVICES ($r_i$) (93) | FILE SIZE × NUMBER OF POSSESSING INFORMATION PROCESSING DEVICES ($s_i \times r_i$) (94) |
|---|---|---|---|---|---|---|---|---|---|
| FILE NAME ($i$) (91a) | FILE SIZE ($s_i$) (91b) | h | n | n+1 | n+2 | n+3 | n+4 | | |
| 1 | 2 | O | O | O | X | X | O | 4 | 8 |
| 2 | 4 | O | X | O | X | O | O | 4 | 16 |
| 3 | 3 | O | X | X | O | X | X | 4 | 12 |
| 4 | 100 | X | O | O | O | X | O | 2 | 200 |
| 5 | 3 | X | O | O | O | O | O | 4 | 12 |
| 6 | 5 | X | X | X | X | O | O | 5 | 25 |
| 7 | 17 | X | X | X | O | O | X | 2 | 34 |
| 8 | 7 | X | X | X | O | O | X | 2 | 14 |
| REDUNDANT DATA TOTAL AMOUNT $D_j$ $\sum_{i=1}^{n} s_i \times (r_i - 1)$ | | 27 | 135 | 73 | 62 | 65 | 147 | | |

FIG. 12

| GROUP NUMBER | OS NAME | CORRECTION PROGRAM NUMBER | OS VERSION | MULTICAST ADDRESS | BASIC IMAGE NAME |
|---|---|---|---|---|---|
| 1 | WxxxA | 1 | 2 | 225.0.0.1 | BASIC IMAGE1 |
| 2 | WxxxA | 2 | 2 | 225.0.0.2 | BASIC IMAGE2 |
| 3 | Wxxx7 | — | — | 225.0.0.3 | BASIC IMAGE3 |
| 4 | Lxxx | — | — | 225.0.0.4 | BASIC IMAGE4 |
| 5 | Wxxx C | — | — | 225.0.0.5 | BASIC IMAGE5 |
| 6 | Wxxx Z | 5 | 3 | 225.0.0.6 | BASIC IMAGE6 |
| ... | ... | ... | ... | ... | ... |

FIG. 13

| INFORMATION PROCESSING DEVICE NUMBER | MODEL NAME | GROUP NUMBER | IP ADDRESS | DIFFERENCE IMAGE NAME |
|---|---|---|---|---|
| 1 | BX920 | 5 | XXX.XXX.XXX.XX1 | DIFFERENCE IMAGE1 |
| 2 | BX921 | 5 | XXX.XXX.XXX.XX2 | DIFFERENCE IMAGE2 |
| 3 | BX922 | 5 | XXX.XXX.XXX.XX3 | |
| 4 | BX923 | 5 | XXX.XXX.XXX.XX4 | DIFFERENCE IMAGE3 |
| ... | ... | ... | ... | ... |

| FILE NAME | FILE SIZE | UPDATE DATA | CRC VALUE |
|---|---|---|---|
| FILE1 | 2 MB | 2010/11/1 | 5A7F |
| FILE2 | 4 MB | 2010/12/1 | 7F5A |
| FILE3 | 3 MB | 2010/12/10 | 4B5C |
| ... | ... | ... | ... |

F I G. 1 4

| FILE NAME | FILE SIZE | POSSESSION FLAG |
|---|---|---|
| FILE1 | 2 MB | ○ |
| FILE2 | 4 MB | ○ |
| FILE3 | 3 MB | × |
| ... | ... | ... |

F I G. 1 5

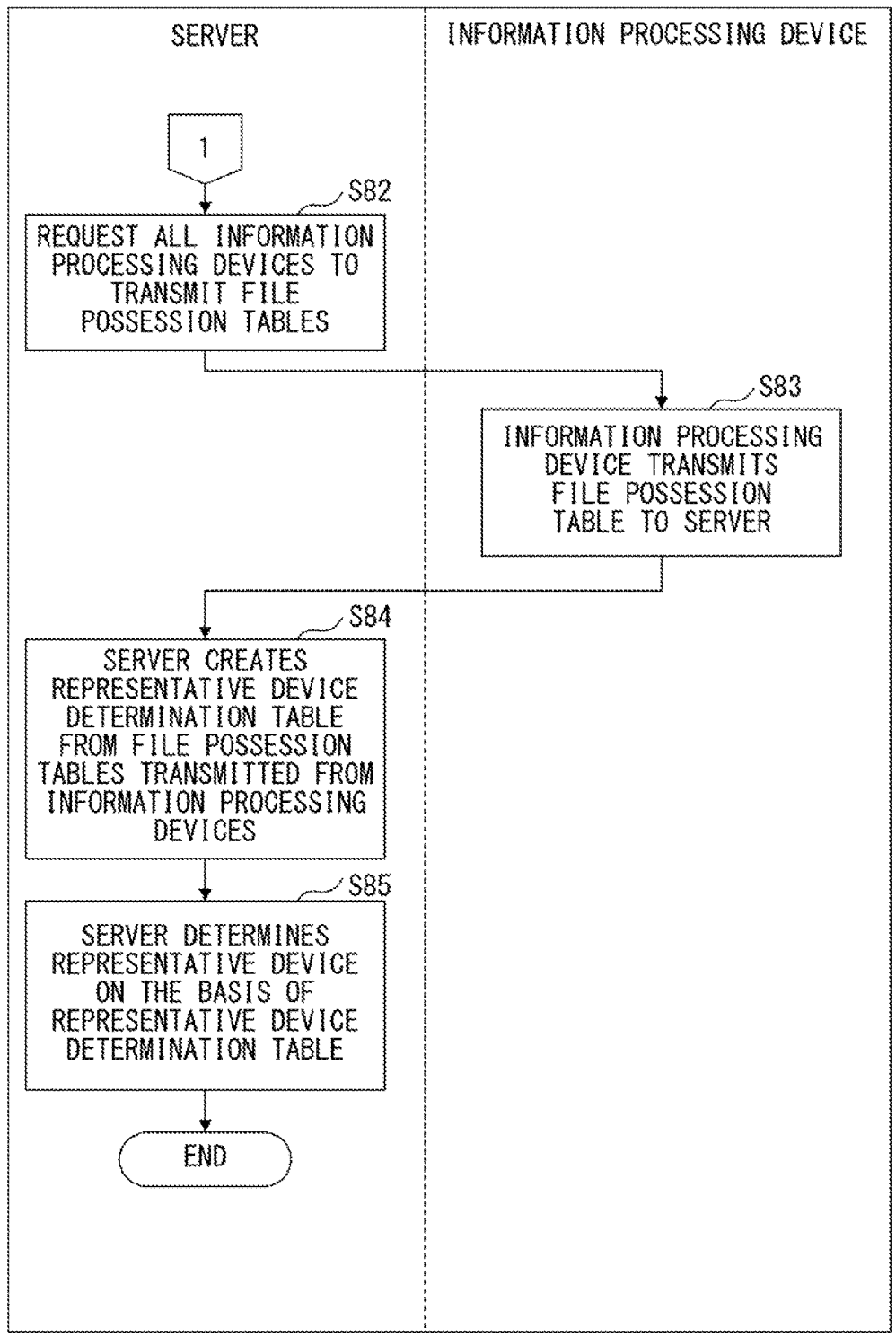
F I G. 20C

FIG. 21A

FIG. 21B (5) SINCE FILE ATTRIBUTE INFORMATION POSSESSED BY INFORMATION PROCESSING DEVICES n+3 AND n+4 IS NOT DIFFERENT FROM FILE ATTRIBUTE INFORMATION RECEIVED SO FAR, INFORMATION PROCESSING DEVICES n+3 AND n+4 DO NOT TRANSMIT FILE ATTRIBUTE INFORMATION BY MULTICAST (6) FILE POSSESSION TABLES FINALLY CREATED BY INFORMATION PROCESSING DEVICE

| | File Attribute Information 91 | | Information Processing Device Name (member) 52 | | | | | | Number of Possessing Information Processing Devices ($r_i$) 93 | File Size × Number of Possessing Information Processing Devices ($s_i \times r_i$) 94 |
|---|---|---|---|---|---|---|---|---|---|---|
| | File Name (i) 91a | File Size ($s_i$) 91b | h | n | n+1 | n+2 | n+3 | n+4 | | |
| | 1 | 2 | O | O | O | × | × | O | 4 | 8 |
| | 2 | 4 | O | × | O | × | O | O | 4 | 16 |
| | 3 | 3 | O | × | O | O | O | × | 4 | 12 |
| | 4 | 100 | × | O | × | × | × | O | 2 | 200 |
| | 5 | 3 | × | O | O | O | × | O | 4 | 12 |
| | 6 | 5 | × | O | O | × | O | O | 5 | 25 |
| | 7 | 17 | × | × | O | O | O | × | 2 | 34 |
| | 8 | 7 | × | × | × | O | O | × | 2 | 14 |
| Redundant Data Total Amount $D_j$ $\sum_{i=1}^{m} s_i \times (r_j - 1)$ | | | 27 | 135 | 73 | 62 | 65 | 147 | | |

BACKUP METHOD AND STORAGE MEDIUM HAVING BACKUP PROGRAM STORED THEREIN

CROSS-REFERENCE TO RELATED APPLICATION

This application is based upon and claims the benefit of priority of the prior Japanese Patent Application No. 2011-100092, filed on Apr. 27, 2011, the entire contents of which are incorporated herein by reference.

FIELD

This specification relates to a technique for executing backup of a system through a network.

BACKGROUND

In a system in which a large number of information processing apparatuses connected via a network are present, there is a technique for performing backup of files of the information processing apparatuses via a network.

For example, there is a technique described below. A backup system includes a hard disk, a backup server, a monitoring unit, an extracting unit, an upload unit, a difference generating unit, a user database, and a download unit. The hard disk is connected to a terminal apparatus and accumulates data. The backup server is connected to the terminal apparatus via an IP network. The monitoring unit monitors, on the terminal apparatus side, a data occupancy ratio in the hard disk. The extracting unit extracts data according to a data attribute when the data occupancy ratio is equal to or higher than a predetermined data occupancy ratio. The upload unit transmits the extracted data to the backup server. The difference generating unit is provided on the backup server side and generates difference data between existing data already accumulated and the uploaded data. The user database accumulates the generated difference data. The download unit generates, according to a request from the terminal apparatus side, data for download from the existing data and the difference data and transmits the data for download to the terminal apparatus.

Patent Document 1: WO2005/093579.

SUMMARY

A backup program for causing two or more information processing devices connected to an information processing apparatus via a network to execute backup of file data stored in storing units by the information processing devices is stored in a computer-readable storage medium. The backup program causes the information processing devices to execute processing explained below. When an information processing device is designated as a first device among plural information processing devices, the first device transmits a first backup image concerning all file data stored in a storing unit of the first device to the information processing apparatus. At the same time, the first device transmits the first backup image to a second device, which is an information processing device other than the first device. When an information device is the second device, the second device extracts a difference image, which is a difference between the first backup image transmitted from the first device and a second backup image concerning all file data stored in a storing unit of the second device. The second device transmits the difference image to the information processing apparatus.

A backup program for causing an information processing apparatus connected to information processing devices via a network to execute control processing for backup of file data of the information processing devices is stored in a computer-readable storage medium. The backup program causes the information processing apparatus to execute processing explained below. The information processing apparatus receives, from the information processing devices, determination results obtained by determining which file data possessed by the information processing devices are present among file data corresponding to attribute information of file data transmitted and received and shared among information processing devices classified into an arbitrary group. The information processing apparatus determines, using the received determination result, any one of the information processing devices in the group as the first device according to a data amount of file data redundantly possessed in the group. The information processing apparatus receives the first backup image concerning all file data stored in a storing unit of the first device. The information processing apparatus receives a difference image from a second device, which is an information processing apparatus other than the first device, classified into the group to which the first device belongs. The difference image is a difference between the first backup image transmitted from the first device to the second device and a second backup image concerning all file data stored in a storing unit of the second device. The information processing apparatus stores the first backup image and the difference image in a storing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts an example of a group management table in the first embodiment.

FIG. 4 depicts an example of an information processing device management table in the first embodiment.

FIG. 10 depicts an example of a performance management table in the second embodiment.

FIG. 11 depicts an example of a representative device determination table in the second embodiment.

FIG. 12 depicts an example of a group management table in the second embodiment.

FIG. 13 depicts an example of an information processing device management table in the second embodiment.

FIG. 14 depicts an example of a file attribute table in the second embodiment.

FIG. 15 depicts an example of a file possession table in the second embodiment.

FIGS. 20A, 20B and 20C depict a flow of representative device selection processing (S42) in the second embodiment.

FIGS. 21A, 21B and 21C are a diagram for explaining creation and update of file possession tables of members in the second embodiment.

FIG. 22 is a diagram for explaining a method of determining a representative device using the representative device determination table in the second embodiment.

DESCRIPTION OF EMBODIMENTS

When backup is executed in an information processing device, it is possible to store, as one image file, data stored in a storage device of the information processing device while keeping file structure of a file system. The image file created in this way can be used for restoring a state of the storage device, for example, when a failure of the storage device occurs.

In general, the backup can be classified into full-backup for collectively backing up all data, a differential backup for backing up only data changed or added after the last full-backup, and an incremental backup for backing up only a change and addition after the last backup.

In an environment in which a large number of information processing devices are present, when the full-backup for all the information processing devices is performed via a network, it is conceivable to simultaneously subject all the information processing devices to the full-backup or dividedly subject one information processing device or several information processing devices to the full-backup. In both the cases, image files of the full-backup in the respective information processing devices are transmitted to a server by unicast communication.

However, when all the information processing devices are simultaneously subjected to the full-backup, since a large amount of data flows onto a network at a time, loads on the server and the network increase. Nevertheless, if one or plural information processing devices are dividedly subjected to the full-backup, long time is required until the end of the backup of all the information processing devices.

Therefore, in this specification, a backup technique that can reduce the loads on the server and the network and the time required for the entire backup processing is explained.

First Embodiment

The first embodiment is explained below. Information processing devices connected by a network are classified into groups according to the performances of the information processing devices. In each of the groups, a predetermined information processing device (a representative device) transmits a full-backup image file of the representative device to a server and, at the same time, transmits, by multicast, the full-backup image file to the other information processing devices in the group to which the representative device belongs. Each of the other information processing devices transmits a difference between the full-backup image file of the representative device and full-backup image of the information processing device to the server.

Figure 1:
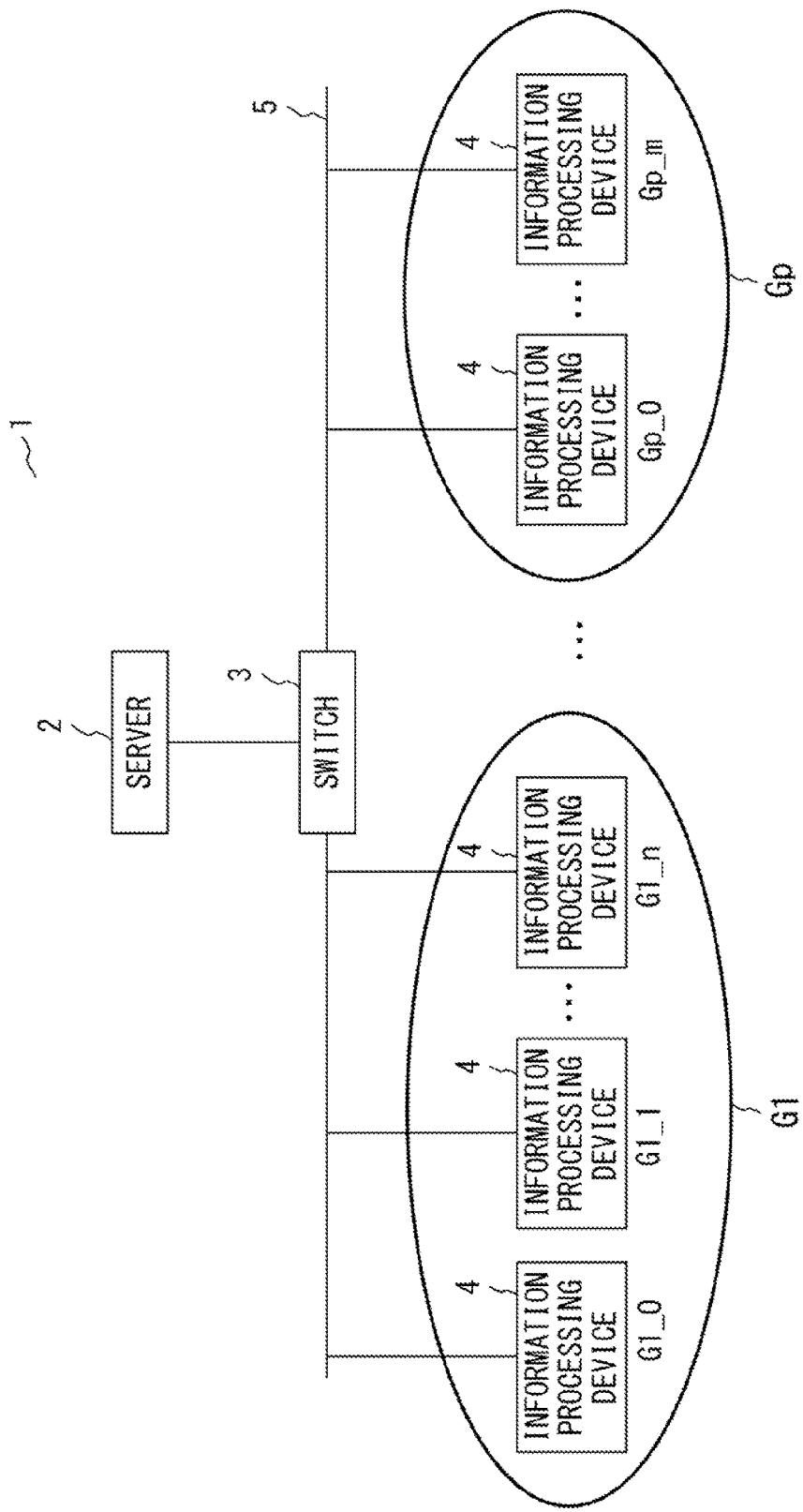
FIG. 1 depicts an example of the configuration of a backup system in the first embodiment.

FIG. 1 depicts an example of the configuration of a backup system in the first embodiment. The backup system 1 includes a server 2, a switch 3, plural information processing devices 4, and a network 5. The plural information processing devices 4 are connected on the network 5.

The switch 3 is one of network devices that connect networks among information processing apparatuses. The switch 3 can switch communication paths among the information processing devices 4 and between the information processing devices 4 and the server 2 and relay a packet according to destination information included in a header of the packet. The packet is a transmission unit in an Internet layer in a TCP/IP [Transmission Control Protocol/Internet Protocol] model, which is one of communication models. The switch 3 has a function corresponding to multicast.

The multicast is a technique for realizing one-to-many data delivery and can deliver data to information processing devices belonging to a specific group all at once. This group is called multicast group and is identified by a multicast address (class D address: 224.0.0.0 to 239.255.255.255).

In a data delivery method by the multicast, a network device such as a switch copies one data delivered from a delivery source and delivers the data to only a specific information processing device. Therefore, compared with unicast transmission and broadcast transmission, when multicast transmission is used, efficiency of utilization of a network band is high. The unicast transmission is a method in which a delivery source generates data and transmits the data to each of all information processing devices. The broadcast transmission is a method in which a network device copies one data and transmits the data to all information processing devices on the same sub-network.

In FIG. 1, the information processing devices 4 present on the network 5 are respectively classified according to the performances of the information processing devices 4 and belong to any ones of groups G1 to Gp. As the information processing devices 4 belonging to the group G1, for example, there are information processing devices G1_0, G1_1, . . . , and G1_n. As the information processing devices 4 belonging to the group Gp, for example, there are information processing devices Gp_0, Gp_1, . . . , and Gp_m. In each of the groups, an arbitrary information processing device Gx_0 is referred to as "representative device". The information processing devices in the group are referred to as "members". Here, n, m, p, and x are arbitrary integers.

The representative device creates a full-backup image file of a storage device of the representative device. A full-backup image of the representative device is referred to as "basic image". Each of the information processing devices in the group other than the representative device creates a full-backup image file of storage device of the information processing device and calculates a difference (a difference image) between the created full-backup image file of the information processing device and the basic image of the representative device.

The server 2 acquires, in a group unit, basic images from the representative devices. The server 2 acquires the difference images from the information processing devices in the groups other than representative devices. In other words, the server 2 can acquire, in a group unit, the basic images serving as references and the difference images. Consequently, the server 2 can acquire backup images in a group unit.

Figure 2:
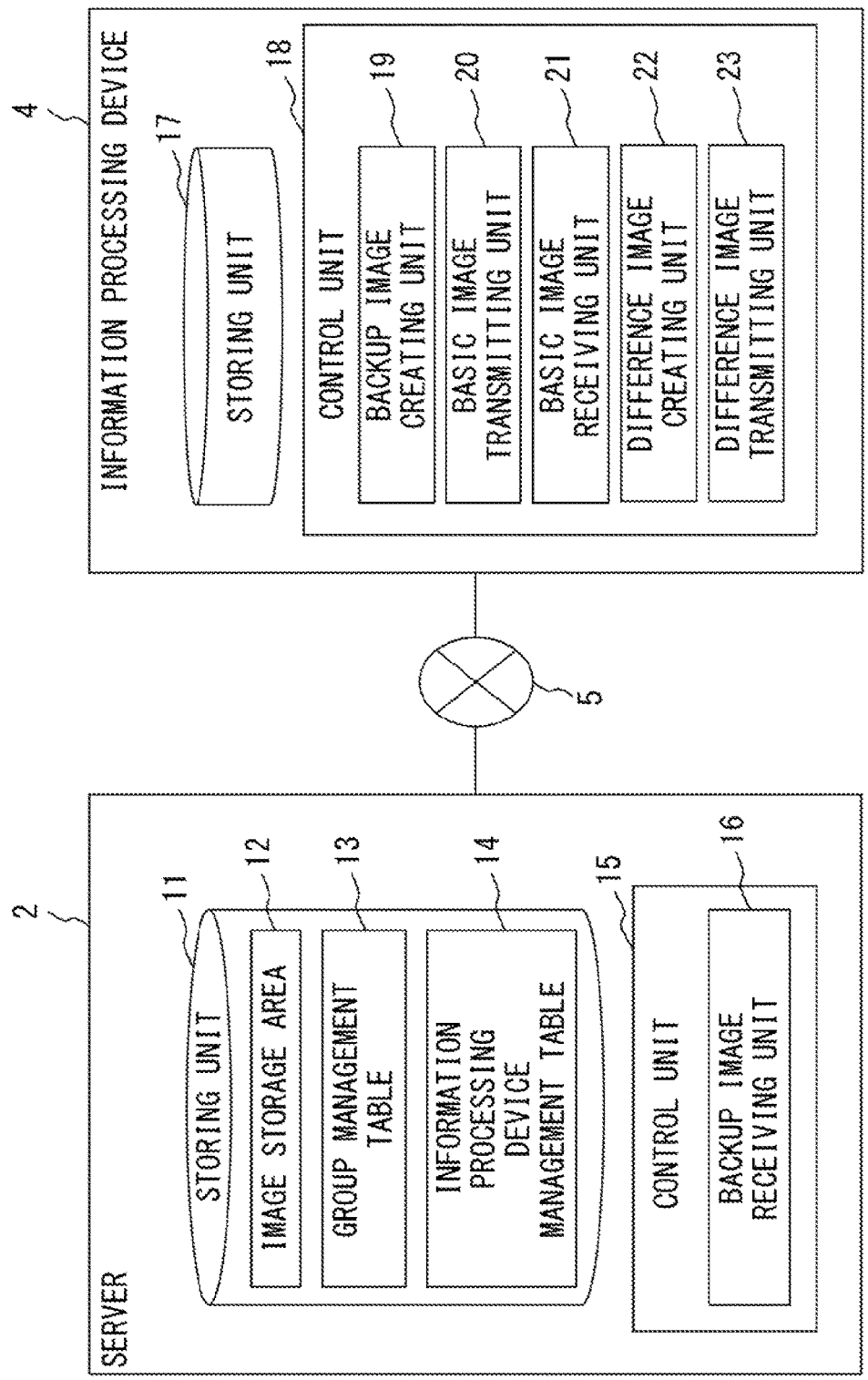
FIG. 2 depicts an example of functional blocks of a server and an information processing device in the first embodiment.

FIG. 2 depicts an example of functional blocks of the server and the information processing device in the first embodiment. The server 2 includes a storing unit 1 and a control unit 15. The storing unit 11 includes an image storage area 12. In the image storage area 12, a backup image acquired from the information processing device 4 to be subjected to image backup via a network 5 is stored. Specifically, in the image storage area 12, the basic images acquired from the representative devices and the difference images acquired from the information processing devices in the groups other than the representative devices are stored. In the storing unit 11, a group management table 13 and an information processing device management table 14 are stored. The storing unit 11 may be incorporated in the server 2 or may be externally attached to the server 2.

The group management table 13 is used to manage the groups on the network 5. The groups are obtained by classifying the information processing devices present on the network according to the performances of the information processing devices. The information processing device management table 14 is used to manage the information processing devices belonging to the groups.

The control unit 15 instructs a arbitrary information processing device 4 (the representative device) of each of the groups to execute backup according to this embodiment and executes processing according to responses from the information processing devices 4. The control unit 15 functions as a backup image receiving unit 16. The backup image receiving unit 16 acquires backup images (the basic image and the difference images) transmitted from the information processing devices 4 and stores the backup images in the image storage area 12.

The information processing device 4 includes a storing unit 17 and a control unit 18. The control unit 18 functions as a backup image creating unit 19, a basic image transmitting unit 20, a basic image receiving unit 21, a difference image creating unit 22, and a difference image transmitting unit 23.

The backup image creating unit 19 creates a full-backup image of the storing unit 17 of the information processing device 4. Specifically, the backup image creating unit 19 stores file data, which is stored in the storing unit 17 of the information processing device 4, in the storing unit 17 as one image file (full-backup image) while keeping file structure of a file system. The full-backup image of the representative device is referred to as "basic image".

The basic image transmitting unit 20 divides the created basic image in a predetermined unit and transmits the divided basic images (data blocks) to the information processing devices (members) belonging to the same group in a data block unit by multicast.

The basic image receiving unit 21 receives the basic image transmitted from the representative device. The difference image creating unit 22 calculates a difference between the full-backup image of the storing unit 17 of the information processing device 4 itself created by the backup image creating unit 19 and the received basic image. The difference is obtained as a difference image. As a method of acquiring a difference, for example, there is a method of comparing basic images and obtaining, as a difference image, only different portions of the basic images stored together with offset information (offset information from a head position). For example, there is also a method of obtaining, as a difference image, if not the same as the basic image, all full-backup images of the storing unit 17 of the information processing device 4 itself. The difference image transmitting unit 23 transmits the difference image to the server 2.

In the storing unit 17, file data (or a file) to be backed up managed by the file system is stored. The file is a set of information recorded in a storage device such as a hard disk in a computer. The file includes, for example, a program file having recorded therein a computer program, a document file, an image file, a spreadsheet file, a music file, a moving image file, and a data file having recorded therein a database or the like. In the storing unit 17, the basic image and/or the difference image is also stored.

FIG. 3 depicts an example of the group management table in the first embodiment. The group management table 13 includes data items such as "group number" 31, "multicast address" 32, and "basic image name" 33.

In the "group number" 31, information for identifying groups on the network 5 is stored. In the "multicast address" 32, multicast addresses allocated to groups specified by group numbers are stored. In the "basic image name" 33, information for identifying basic images of representative devices of the groups specified by the group numbers is stored.

FIG. 4 depicts an example of the information processing device management table in the first embodiment. The information processing device management table 14 includes data items such as "information processing device number" 41, "group number" 42, and "difference image name" 43.

In the "information processing device number" 41, information for identifying information processing devices is stored. In the "group number" 42, group numbers of groups to which the information processing devices belong are stored. In the "difference image name" 43, information for identifying difference images specified by group numbers and information processing device numbers is stored. If an information processing device is a representative device, since the information processing device does not create a difference image, a difference image name is not stored in the "difference image name" 43.

Figure 5:
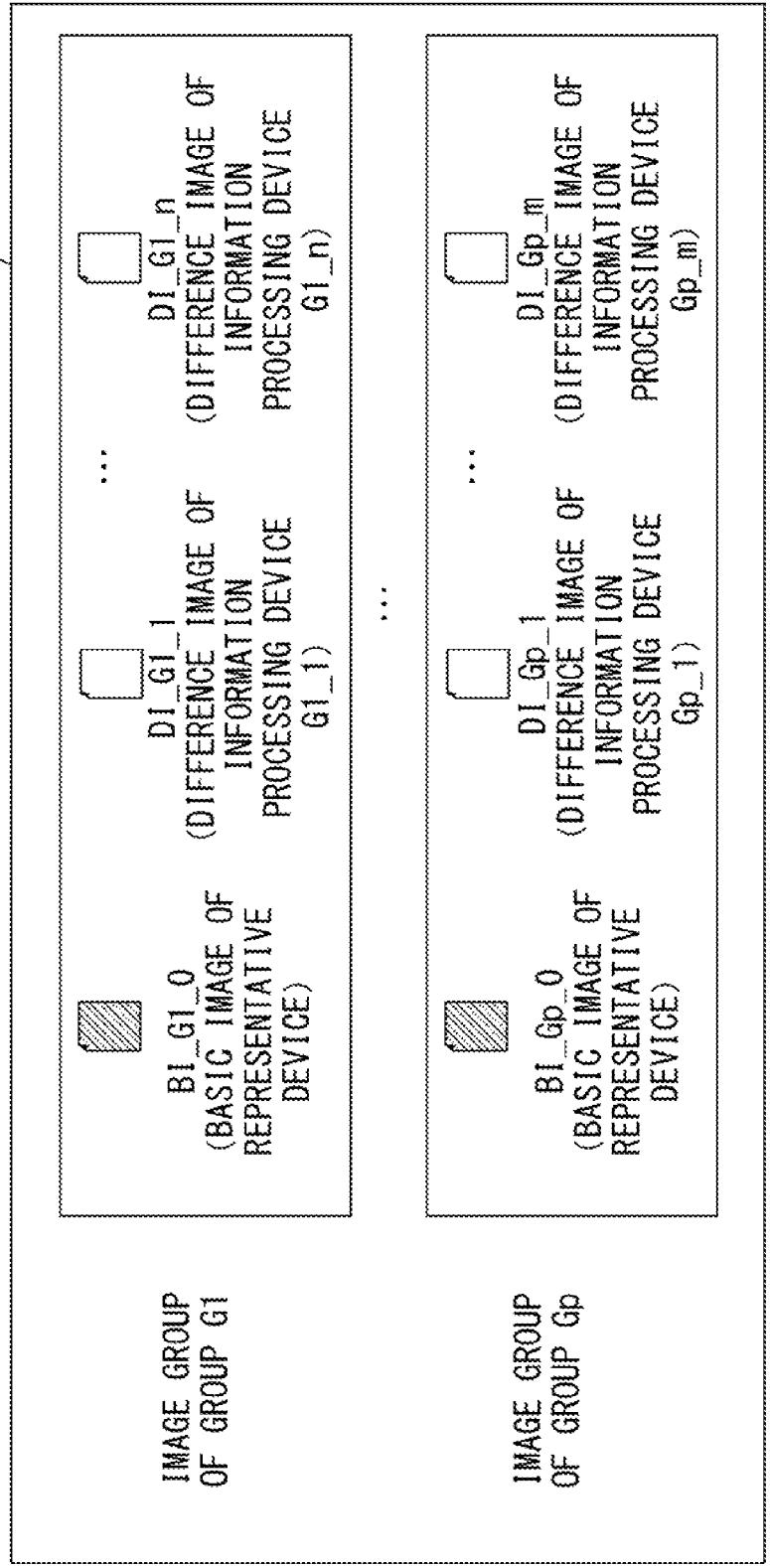
FIG. 5 is a diagram for explaining a relation between a basic image and a difference image in the first embodiment.

FIG. 5 is a diagram for explaining a relation between a basic image and difference images in the first embodiment.

In the image storage area 12 in the storing unit 11 of the server 2, in a group unit, a basic image of a representative device and difference images of information processing devices as members of the group are stored.

For example, concerning a group G1, a basic image BI_G1_0 of a representative device G1_0 is stored and difference images DI_G1_1, . . . , and DI_G1_$n$ of members G1_1, . . . , and G1_$n$ are stored.

For example, concerning a group Gp, a basic image BI_Gp_0 of a representative device Gp_0 is stored and difference images DI_Gp_1, . . . , and DI_Gp_n of members Gp_1 . . . , and Gp_n are stored.

Figure 6:
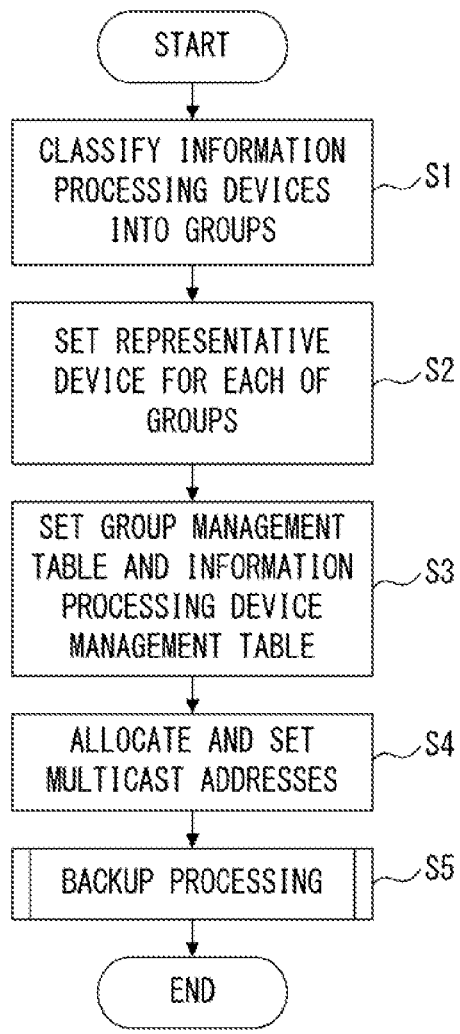
FIG. 6 depicts an example of processing of a backup system in the first embodiment.

FIG. 6 depicts an example of processing of the backup system in the first embodiment. First, a user classifies the information processing devices 4 on the network 5 into groups according to the performances of the information processing devices 4 (S1). The performance of the information processing device 4 includes, for example, information concerning software that affects a processing ability of the information processing device 4 such as a type of an operating system (OS) installed in the information processing device 4, presence or absence of a correction program, and a version of the OS and information concerning hardware such as an information processing device number, a model name, a CPU (central processing unit), a memory capacity, a hard disk capacity, a LAN (Local Area Network) driver. In this embodiment, the user groups the information processing devices 4, for example, in the order of (i) the OS, (ii) the correction program number and the version of the OS, and (iii) the processing ability. At this point, a model having an extremely low processing ability may be set as an independent group without being included in a group classified by (i) and (ii). In this embodiment, it is assumed that, as a result of the grouping, for example, the groups G1 to Gp explained with reference to FIG. 1 are formed.

Subsequently, the user selects, for each of the groups, an arbitrary information processing device 4 as a representative device (S2). In this embodiment, for example, as explained with reference to FIG. 1, a representative device (e.g., G1_0 or Gp_0) is selected for each of the groups.

Subsequently, the user allocates group numbers to the groups. The user registers the group numbers and information processing device numbers of members of the groups in the group management table 13 and the information processing device management table 14, which are stored in the storing unit 11 of the server 2, in association with each other (S3).

Subsequently, the server 2 allocates multicast addresses to the groups. The server 2 sets the information processing devices of the groups as members of groups of multicast using the group management table 13 and the information processing device management table 14 (S4).

As an example of the multicast setting, the server 2 notifies the information processing devices 4 (excluding representative devices) of the groups of multicast addresses on the basis of the group management table 13 and the information processing device management table 14. The information processing devices 4 (excluding the representative devices) transmit participation request information (join) in the groups of the notified multicast addresses to the switch 3 using IGMP. IGMP is the abbreviation of Internet Group Management Protocol. Consequently, the information processing devices (excluding the representative devices) can participate in the groups of the notified multicast addresses.

As another example of the multicast setting, the server 2 may dynamically allocate multicast addresses to the members of the groups using MADCAP on the basis of the group management table 13 and the information processing device management table 14. MADCAP is the abbreviation of Multicast Address Dynamic Client Allocation Protocol. Multicast addresses are not allocated to the representative devices.

However, in S14 in FIGS. 7A and 7B referred to later, when a filter function concerning a transmission source by IGMP is used, if a transmission source of multicast transmission is a representative device itself, the multicast transmission can be set to be unable to be received. Therefore, when the filter function is used, in the two multicast setting examples, the representative devices may participate in the groups of the multicast addresses. The multicast setting is not limited to the method explained above. The multicast setting may be performed using various protocols and methods.

Thereafter, the server 2 notifies the representative devices of the groups of a backup command at predetermined timing or according to an instruction from the user. Consequently, backup processing in this embodiment is executed (S5). Processing in S5 is explained in detail with reference to FIGS. 7A and 7B.

In S1, the server 2 may group the information processing devices at random. In S2, the server 2 may select arbitrary information processing devices in the groups as representative devices. The server 2 may allocate group numbers to the groups and register the group numbers and the information processing device numbers of the members of the groups in the group management table 13 and the information processing device management table 14 in association with each other.

Figure 7A:
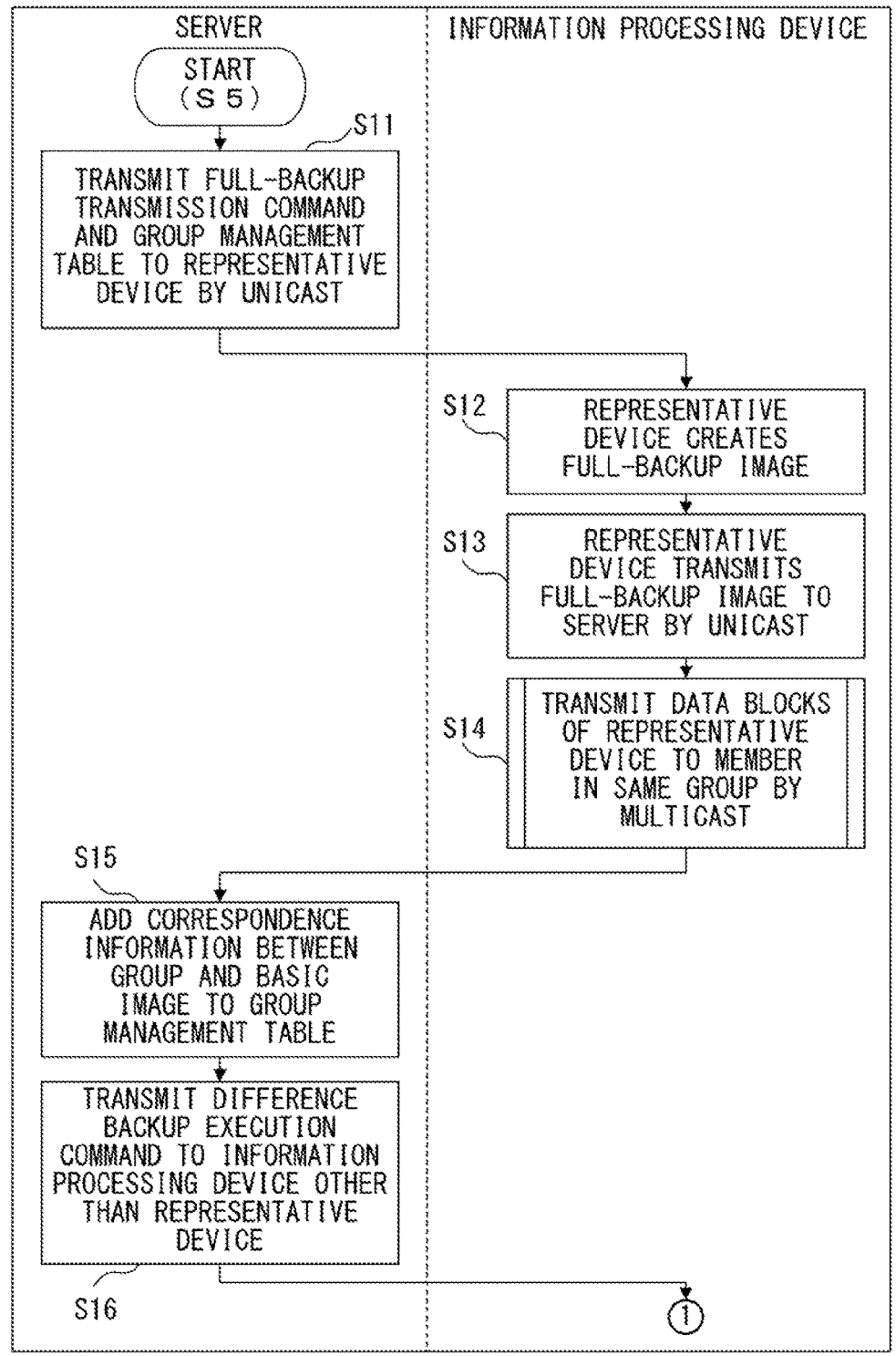
FIGS. 7A and 7B depict a flow of backup processing in the first embodiment.
Figure 7B:
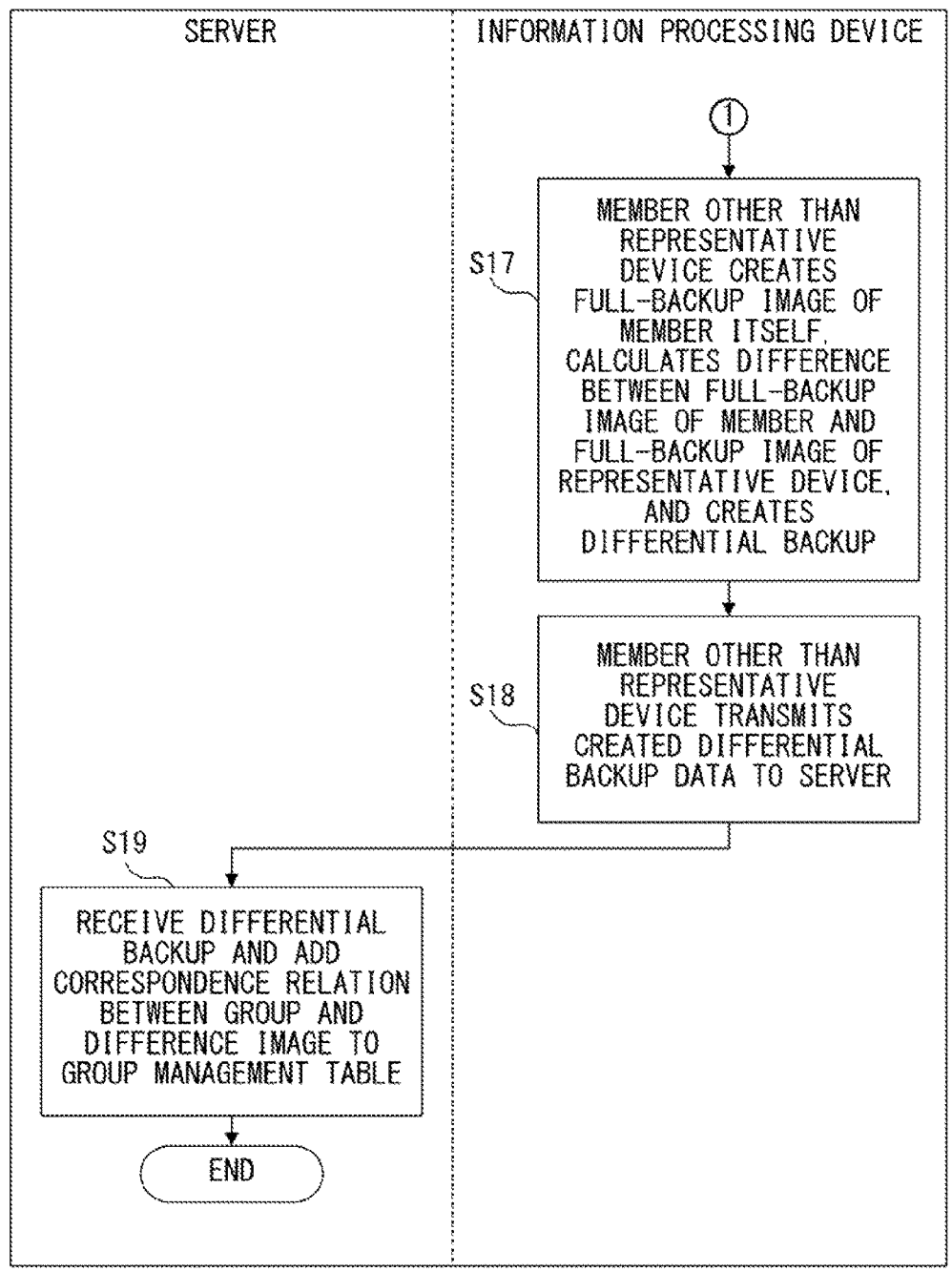

FIGS. 7A and 7B depict a flow of backup processing in the first embodiment. In the server 2, the control unit 15 transmits full-backup transmission request information and the group management table 13 to the representative device of each of the groups (S11).

The representative device of the group receives the full-backup transmission request information and the group management table 13 from the server 2. The backup image creating unit 19 creates full-backup image (basic image) of the storing unit 17 of the representative device by the full-backup transmission request information from the server 2 (S12).

The backup image creating unit 19 transmits the created base image to the server 2 by unicast (S13).

The control unit 15 of the server 2 functions as the backup image receiving unit 16. In this case, the backup image receiving unit 16 receives the basic images transmitted from the information processing devices and stores the basic images in the image storage area 12 of the storing unit 11.

Thereafter, in each of the representative devices, the basic image transmitting unit 20 divides the created basic images in a predetermined unit and transmits, by multicast, the divided basic images to the members of the same groups in a data block unit (S14). The basic image receiving unit 21 in each of the information processing devices 4 other than the representative device belonging to the same groups receives the basic image transmitted from the representative device. Processing in S14 is explained with reference to FIG. 8. When the transmission of the basic image to the members in the group by multicast is completed, the representative device notifies the server 2 to that effect.

In the server 2, the backup image receiving unit 16 registers basic image names of the basic images transmitted in S13 in the "basic image name" 33 corresponding to the group number of the group management table 13 (S15). The control unit 15 transmits a differential backup execution command to the members other than the representative devices of the groups (S16).

The members other than the representative devices of the groups receive the differential backup execution command. Then, in each of the members, the backup image creating unit 19 creates full-backup image of the information processing device 4. The difference image creating unit 22 calculates a difference between the full-backup image of the information processing devices 4 and the basic image transmitted from the representative device and creates difference image (S17). The difference image transmitting unit 23 transmits the created difference image to the server 2 (S18).

In the server 2, the backup image receiving unit 16 receives the difference images transmitted from the members and stores the difference images in the image storage area 12 of the storing unit 11. The backup image receiving unit 16 registers difference image names of the transmitted difference images in the "difference image name" 43 corresponding to combinations of the information processing device numbers and the group numbers of the information processing device management table 14 (S19).

Figure 8:
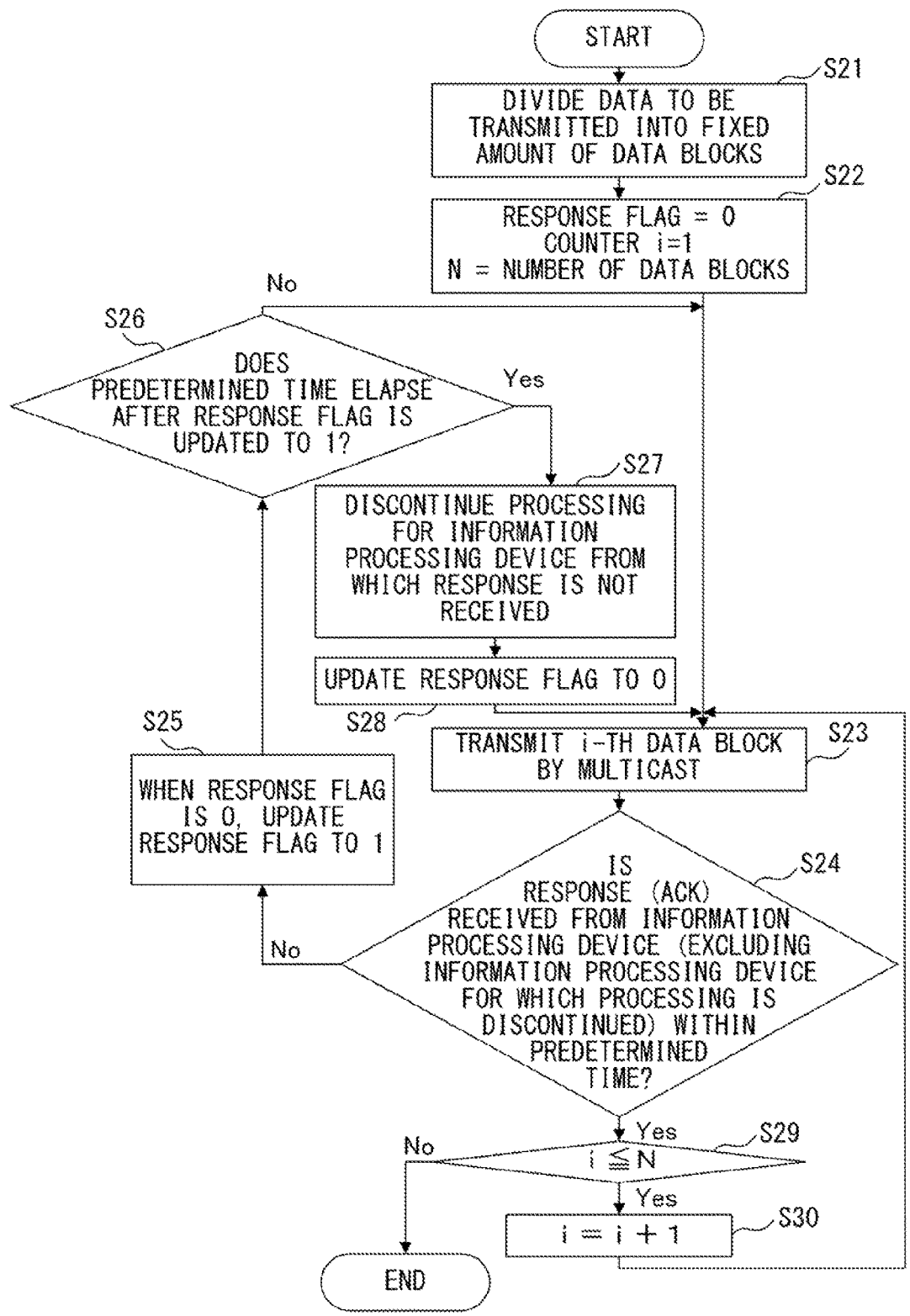
FIG. 8 depicts a processing flow for transmitting the basic image to members in a group by multicast in the first embodiment.

FIG. 8 depicts a processing flow for transmitting a basic image to the members in the groups by multicast in the first embodiment. The flow is executed by the basic image transmitting unit 20 of the representative device. First, the basic image transmitting unit 20 divides a basic image to be transmitted into a fixed amount of blocks (S21). The divided blocks are referred to as data blocks.

The basic image transmitting unit 20 initializes a response flag with 0 and initializes a counter variable i with 1. Further, the basic image transmitting unit 20 stores the number of data blocks obtained as a result of dividing the basic image in a variable N (S22).

The basic image transmitting unit 20 transmits an i-th data block to the members in the same block by multicast (S23). After transmitting the ith data block in S23, when the basic image transmitting unit 20 receives responses (ACK) from the members in a predetermined time ("Yes" in S24), the basic image transmitting unit 20 proceeds to S29.

On the other hand, when the basic image transmitting unit 20 does not receive responses (ACK) from the members within the predetermined time ("No" in S24) and the response flag is 0, the basic image transmitting unit 20 updates the response flag to 1 (S25). The basic image transmitting unit 20 determines whether a predetermined time elapses after the response flag is updated to 1 (S26). When the predetermined time does not elapse after the response flag is updated to 1 ("No" in S26), the basic image transmitting unit 20 transmits the i-th data block to the members in the same group by multicast again (S23).

When the predetermined time elapses after the response flag is updated to 1 ("Yes" in S26), the basic image transmitting unit 20 discontinues the processing for the members that do not transmit responses (S27). The basic image transmitting unit 20 updates the response flag to 0 (S28).

The basic image transmitting unit 20 transmits the i-th data block to the members in the same group by multicast again (S23). After the transmission, the basic image transmitting unit 20 determines whether the basic image transmitting unit 20 receives responses (ACK) from the members (excluding the members for which the processing is discontinued) within a predetermined time (S24).

When the basic image transmitting unit 20 does not receive responses (ACK) from the members (excluding the members for which the processing is discontinued) within the predetermined time ("No" in S24), the basic image transmitting unit 20 repeats the processing in S25 to S28 and S23.

When the basic image transmitting unit 20 receives responses (ACK) from the members (excluding the members for which the processing is discontinued) within the predetermined time ("Yes" in S24), the basic image transmitting unit 20 determines whether i≤N. When i≤N ("Yes" in S29), the basic image transmitting unit 20 increments i (S30) and proceeds to the processing in S23. While i≤N holds, the basic image transmitting unit 20 repeats the processing in S23 to S30. When i>N ("No" in S29), the processing of the flow ends.

According to this embodiment, when the members in the group create difference images, the representative device transmits the basic image by multicast. The members belonging to the same group can transmit only difference images from the basic image to the server. As a result, time required for backup of all the information processing devices can be reduced and an amount of data to be transmitted can also be reduced.

Second Embodiment

Irrespective of whether all information processing devices on a network are simultaneously backed up or the information processing devices are dividedly backed up for each one or several information processing devices, according to an increase in the number of information processing devices to be backed up, a storage capacity of a storage device of a server necessary for the backup increases in proportion to the number of information processing devices. According to an increase in the number of information processing devices to be backed up, time required for the entire backup processing increases in proportion to the number of information processing devices.

Therefore, in this embodiment, a backup system that can reduce loads on a server and a network, a data amount of entire backup, and time required for entire backup processing is explained. In this embodiment, components and functions same as those in the first embodiment are denoted by reference numerals and signs same as those in the first embodiment. Explanation of the components and the functions is omitted.

Figure 9:
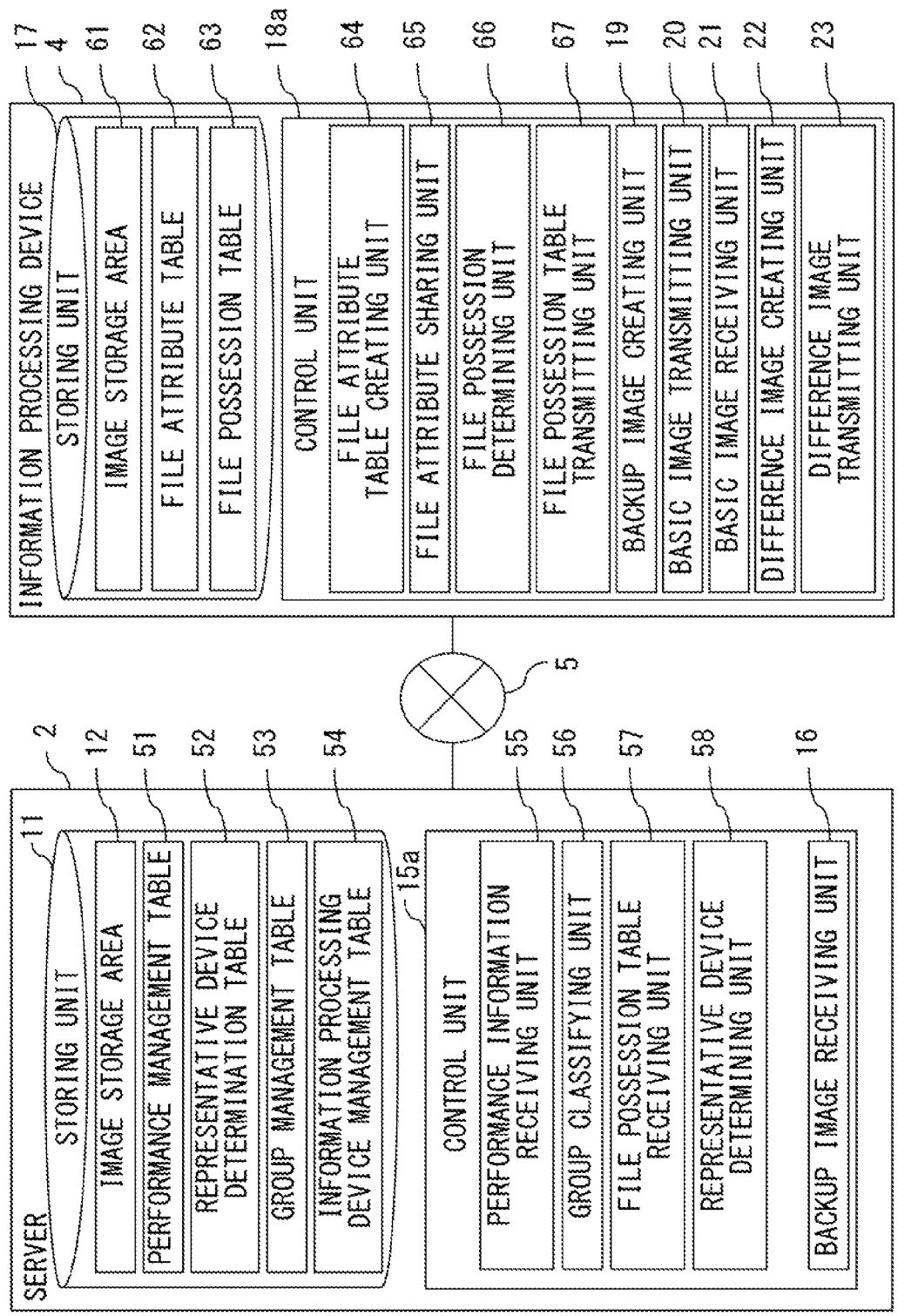
FIG. 9 depicts an example of functional blocks of a server and an information processing device in the second embodiment.

FIG. 9 depicts an example of functional blocks of a server and an information processing device in the second embodiment. The server 2 includes the storing unit 11 and a control unit 15a. The storing unit 11 includes an image storage area 12. In the storing unit 11, a performance management table 51, a representative device determination table 52, a group management table 53, and an information processing device management table 54 are stored. The storing unit 11 may be incorporated in the server 2 or may be externally attached to the server 2.

In the performance management table 51, a part of performance information for each model of the information processing devices 4 connected to the network 5 is stored in advance. The representative device determination table 52 is a work table used by a representative device determining unit 58 in determining a representative device. Like the group management table 13 depicted in FIG. 2, the group management table 53 is used for managing groups on the network 5. Like the information processing device management table 14 depicted in FIG. 2, the information processing device management table 54 is used for managing information processing devices (members) belonging to the groups.

The control unit 15a functions as a performance information receiving unit 55, a group classifying unit 56, a file possession table receiving unit 57, the representative device determining unit 58, and the backup image receiving unit 16. The performance information receiving unit 55 receives performance information from the information processing devices 4 on the network 5. The group classifying unit 56 classifies the information processing devices 4 into groups according to the received performance information. Further, after group classification processing, the group classifying unit 56 allocates multicast addresses to the groups.

The file possession table receiving unit 57 receives a file possession table 63 from the information processing device 4 as explained later. The file possession table 63 stores a determination result obtained by determining which of file data corresponding to attribute information of file data shared among members in the group is file data possessed by the information processing device 4.

The representative device determining unit 58 creates the representative device determination table 52 using the file possession table 63 transmitted from the information processing devices 4. The representative device determining unit 58 selects, using the representative device determination table 52, for each of the groups, representative devices from the information processing devices 4 belonging to the groups such that a sum of backup images including basic images and difference images is minimized.

The backup image receiving unit 16 is the same as that in the first embodiment. Specifically, as explained with reference to FIGS. 7A and 7B, the backup image receiving unit 16 instructs the representative devices of the groups to execute backup according to this embodiment, acquires backup images transmitted from the information processing devices, and stores the backup images in the image storage area 12.

The information processing device 4 includes the storing unit 17 and a control unit 18a. The storing unit 17 includes an image storage area 61. In the image storage area 61, a full-backup image of the storing unit 17 can be stored and the basic images transmitted from the representative devices can be stored. In the storing unit 17, a file attribute table 62 and a file possession table 63 are stored.

In the storing unit 17, a file to be backed up managed by a file system is also stored. The storing unit 17 may be incorporated in the information processing device 4 or may be externally attached to the information processing device 4.

As in the first embodiment, the control unit 18a functions as the backup image creating unit 19, the basic image transmitting unit 20, the basic image receiving unit 21, the difference image creating unit 22, and the difference image transmitting unit 23. Further, the control unit 18a functions as a file attribute table creating unit 64, a file attribute sharing unit 65, a file possession determining unit 66, and a file possession table transmitting unit 67.

The file attribute table creating unit 64 creates the file attribute table 62 on the basis of the files stored in the storing unit 17. In the file attribute table 62, information indicating attributes of the files (file attribute information) is stored.

The file attribute sharing unit 65 extracts, from the file attribute table 62, file attribute information other than file attribute information transmitted from the other information processing devices and transmits the extracted file attribute information to the other members in the same group by multicast. A transmission method by multicast is the same as the transmission method explained with reference to FIG. 8. Consequently, file attribute information possessed by the members in the group are exchanged mutually and shared among the members.

The file possession determining unit 66 creates the file possession table 63 using the file attribute information of the file attribute table 62 of the information processing device including the file possession determining unit 66 and the file attribute information shared with the other information processing devices. The file possession determining unit 66 causes the members in the group to share the file attribute information possessed by the members in the group and determines which files among files corresponding to the shared file attribute information are used by the information processing device. A result of the determination is stored in the file possession table 63.

The backup image creating unit 19 is the same as that in the first embodiment. As explained with reference to FIGS. 7A and 7B, the backup image creating unit 19 creates a full-backup image of the storing unit 17 of the information processing device 4. Specifically, the backup image creating unit 19 stores the files stored in the storing unit 17 of the information processing device 4 in the image storage area 61 as one image file (a full-backup image) while keeping file structure of the file system.

The basic image transmitting unit 20 is the same as that in the first embodiment. As explained with reference to FIG. 8, the basic image transmitting unit 20 divides a created basic image in a predetermined unit and transmits the divided basic images to the members of the same group in a data block unit by multicast.

The basic image receiving unit 21 is the same as that in the first embodiment. As explained with reference to FIGS. 7A and 7B, the basic image receiving unit 21 receives a basic image transmitted from the representative device.

The difference image creating unit 22 is the same as that in the first embodiment. As explained with reference to FIGS. 7A and 7B, the difference image creating unit 22 calculates a difference (a difference image) between the full-backup image of the storing unit 17 of the information processing device 4 itself and the basic image transmitted from the representative device.

The difference image transmitting unit 23 is the same as that in the first embodiment. As explained with reference to FIGS. 7A and 7B, the difference image transmitting unit 23 transmits the difference image obtained by the difference image creating unit 22 to the server 2.

FIG. 10 depicts an example of the performance management table in the second embodiment. In the performance management table 51, performance information of the information processing devices 4 connected to the network 5 is stored in advance.

The performance management table 51 includes data items such as "model name" 81, "CPU" 82, "memory capacity" 83, "hard disk capacity" 84, and "LAN driver" 85.

In the "model name" 81, types or names of models of the information processing devices 4 are stored. In the "CPU" 82, types or names of CPUs mounted on the models are stored. In the "memory capacity" 83, capacities of memories mounted on the models are stored. In the "hard disk capacity" 84, storage capacities of hard disk drives mounted on the models are stored. In the "LAN driver" 85, types or names of LAN drivers of the models are stored.

FIG. 11 depicts an example of the representative device determination table in the second embodiment. The representative device determination table 52 is created in a group unit by the representative device determining unit 58 on the basis of the file possession tables 63 transmitted from the information processing devices 4. The representative device determination table 52 is a table for determining which information processing device in the group should be selected as a representative device to minimize total amount of backup data in the group.

The representative device determination table 52 includes data items such as, for example, "file attribute information" 91, "information processing device name (member)" 92, "number of possessing information processing devices" 93, and "file size×number of possessing information processing devices" 94. The "file attribute information" 91 includes "file name" 91a and "file size" 91b. Details of the representative device determination table 52 are described later.

FIG. 12 depicts an example of the group management table in the second embodiment. The group management table 53 includes data items such as "group number" 101, "OS name" 102, "correction program number" 103, "OS version" 104, "multicast address" 105, and "basic image name" 106.

In the "group number" 101, information for identifying groups classified on the network 5 is stored. In the "OS name" 102, names of OSs used in the groups identified by group names are stored. In the "correction program number" 103, names of correction programs of the OSs are stored. In the "OS version" 104, versions of the OSs are stored. In the "multicast address" 105, multicast addresses allocated to the groups specified by the group numbers are stored. In the "basic image name" 106, information for specifying basic images of representative devices of the groups specified by the group numbers is stored.

FIG. 13 depicts an example of the information processing device management table in the second embodiment. The information processing device management table 54 includes data items such as "information processing device number" 111, "model name" 112, "group number" 113, "IP address" 114, and "difference image name" 115.

In the "information processing device number" 111, information for identifying the information processing devices 4 is stored. In the "model name" 112, model names of the information processing devices 4 are stored. In the "group number" 113, group numbers of groups to which the information processing devices 4 belong are stored. In the "IP address" 114, IP (Internet Protocol) addresses of the information processing devices 4 are stored. In the "difference image name" 115, information for identifying difference images is stored. When the information processing device 4 is a representative device, the information processing device 4 does not create a difference image. Therefore, a difference image name is not stored in the "difference image name" 115.

FIG. 14 depicts an example of the file attribute table in the second embodiment. The file attribute table 62 is stored in the storing unit 17. In the file attribute table 62, attribute information of files (file attribute information) managed by the file system is stored.

The file attribute table 62 includes data items such as "file name" 121, "file size" 122, "update date" 123, and "CRC value" 124. CRC is the abbreviation of Cyclic Redundancy Check.

In the "file name" 121, names of files are stored. In the "file size" 122, sizes (Byte) of the files are stored. In the "update date" 123, update dates of the files are stored. In the "CRC value", CRC values for error detection generated from the files are stored in each information processing device 4.

FIG. 15 depicts an example of the file possession table in the second embodiment. The file possession table 63 is used for determining which files are files possessed by the information processing device including the file possession table 63 among files present in a group.

The file possession table 63 includes data items such as "file name" 131, "file size" 132, and "possession flag" 133. In the "file name" 131, names of files are stored. In the "file size" 132, sizes of the files are stored.

In the "possession flag" 133, concerning files stored in the storing unit 17 of the information processing device including the file possession table 63, "O" is stored. When files same as files transmitted from the other information processing devices are absent in the storing unit 17 of the information processing device, "X" is stored in the "possession flag" 133. When files same as files transmitted from the other information processing devices are present in the storing unit 17 of the information processing device, "O" is already stored in the "possession flag" 133.

Figure 16:
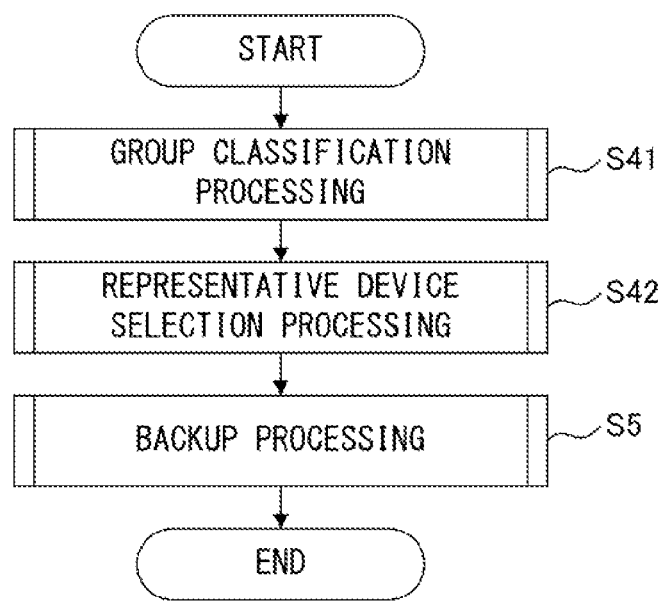
FIG. 16 depicts an example of processing of a backup system in the second embodiment.

FIG. 16 depicts an example of processing of the backup system in the second embodiment. First, the server 2 acquires performance information from the information processing devices 4 on the network 5 and classifies the information processing devices 4 into groups according to the performance information (S41). The server 2 allocates multicast addresses to the information processing devices 4 (members) of the groups in a group unit. Details of processing in S41 are explained with reference to FIG. 17.

Subsequently, in the groups, the members generate file attribute information on the basis of files possessed by the members. The members mutually exchange the file attribute information among the members and share the file attribute information possessed by the members. Each of the members determines a file possessed by the member and a file not possessed by the member from the shared file attribute information. The members transmit the file possession tables 63, in which a result of the determination is stored, to the server 2. The server 2 creates the representative device determination table 52 in a group unit on the basis of the file possession tables 63 transmitted from the information processing devices 4. The server 2 selects, using the representative device determination table 52, for each of the groups, representative devices from the members in the groups such that a sum of backup images including basic images and difference images is minimized (S42). Details of processing in S42 are explained with reference to FIG. 19.

The server 2 notifies the representative devices of the groups of a backup command at predetermined timing or according to an instruction from a user. Consequently, backup processing in this embodiment is executed (S5). Processing in S5 is the same as that in the first embodiment (FIGS. 7A and 7B). Therefore, explanation of the processing is omitted.

Figure 17:
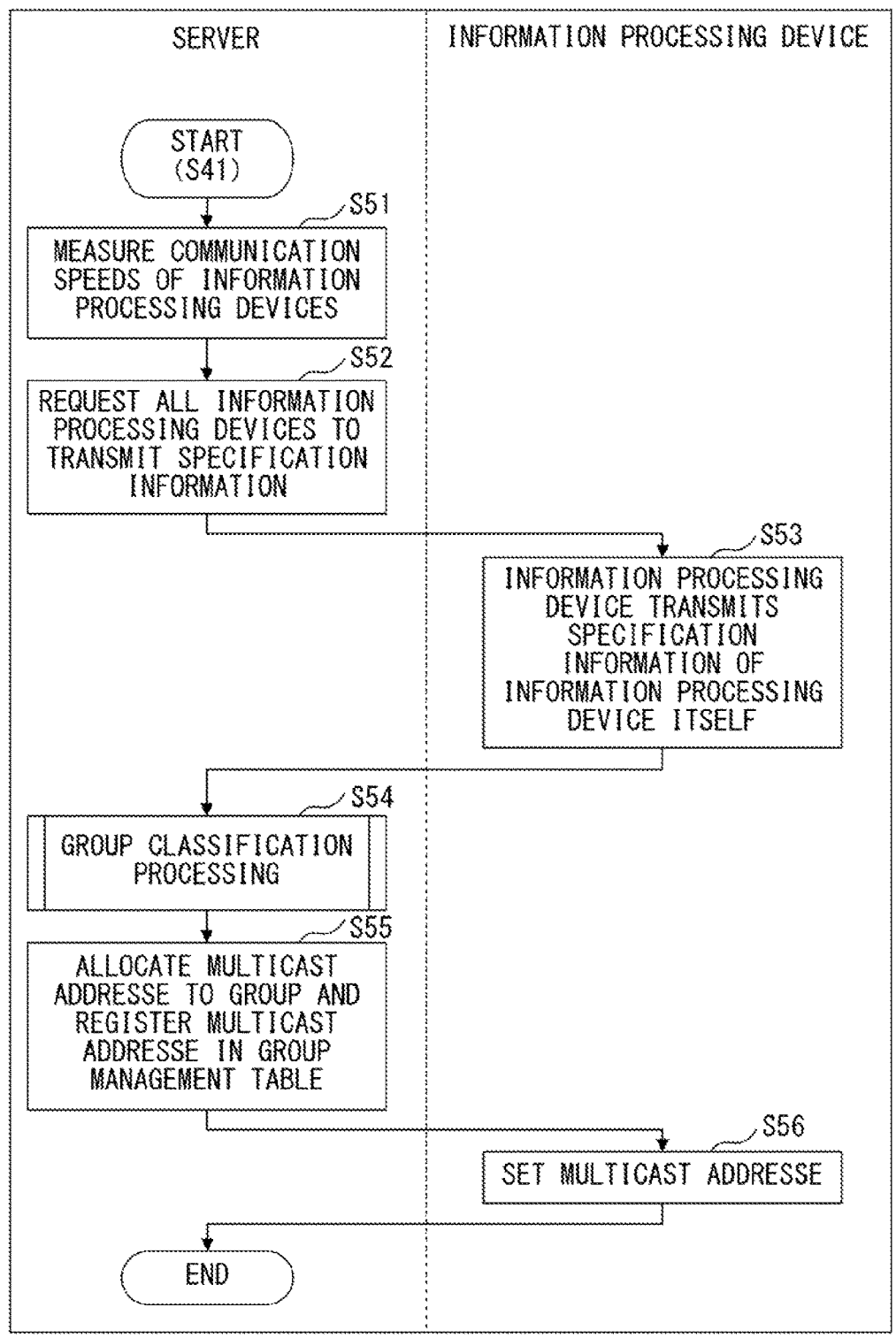
FIG. 17 depicts a processing flow for grouping information processing devices in the second embodiment.

FIG. 17 depicts a processing flow for grouping the information processing devices in the second embodiment. This flow depicts details of the processing in S41 in FIG. 16.

First, in the server 2, the control unit 15a performs communication with the information processing devices 4 and measures communication speeds between the server 2 and the information processing devices 4 (S51). The performance information receiving unit 55 transmits request information to all the information processing devices 4 connected to the network 5 to request the information processing devices 4 to transmit performance information (S52). When the information processing devices 4 receive the request information, the information processing devices 4 transmit performance information of the information processing devices 4 to the server (S53).

The group classifying unit 56 classifies the information processing devices 4 into groups using the performance information transmitted from the information processing devices 4 (S54). At this point, the group classifying unit 56 creates the group management table 53 and the information processing device management table 54. Values are set in the "group number" 101, the "OS name" 102, the "correction program number" 103, and the "OS version" 104 of the group management table 53. Values are set in the "information processing device number" 111, the "model name" 112, and the "group number" 113 of the information processing device management table 54. Details of processing in S54 are explained with reference to FIG. 19.

Subsequently, the group classifying unit 56 allocates multicast addresses to the groups. The group classifying unit 56 specifies the information processing devices (members) belonging to the groups using the group management table 53 and the information processing device management table 54. The group classifying unit 56 sets the information processing devices 4 of the groups as members of the groups of multicast. The group classifying unit 56 sets the allocated multicast addresses in the "multicast address" 105 of the group management table 53 for each of the groups (S55).

As an example of multicast setting, the group classifying unit 56 notifies the information processing devices 4 of the groups of the multicast addresses corresponding to the groups on the basis of the group management table 53 and the information processing device management table 54. The information processing devices 4 transmit participation request information (join) in the groups of the notified multicast addresses to the switch 3 using IGMP. Consequently, the information processing devices 4 can participate in the groups of the notified multicast addresses. In this way, the multicast addresses are set in the members of the groups (S56).

As another example of the multicast setting, the server 2 may dynamically allocate multicast addresses to the members of the groups using MADCAP on the basis of the group management table 53 and the information processing device management table 54. The multicast setting is not limited to the method explained above. The multicast setting may be performed using various protocols and methods.

Figure 18:
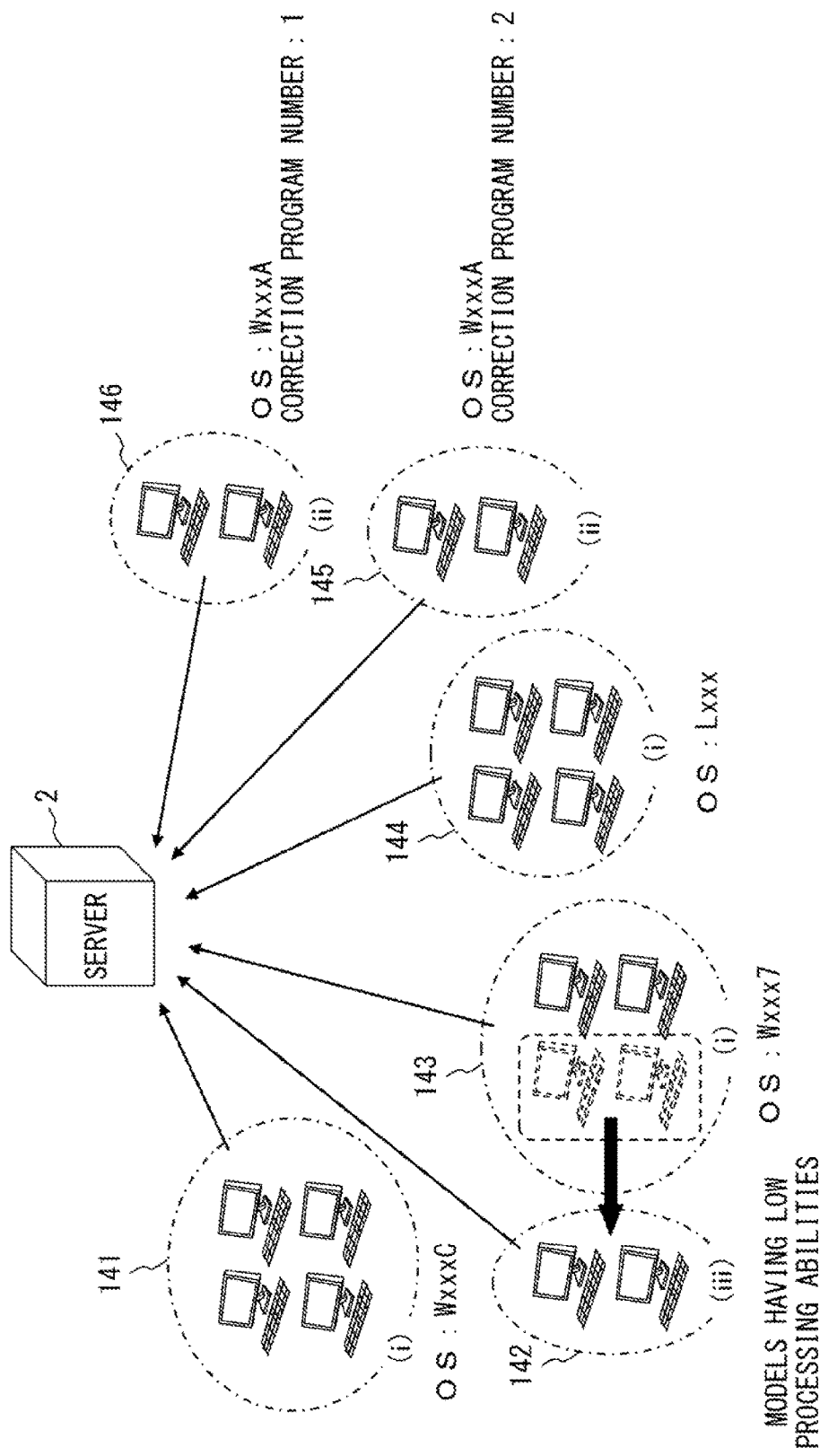
FIG. 18 is a diagram for explaining a group classification processing.
Figure 19:
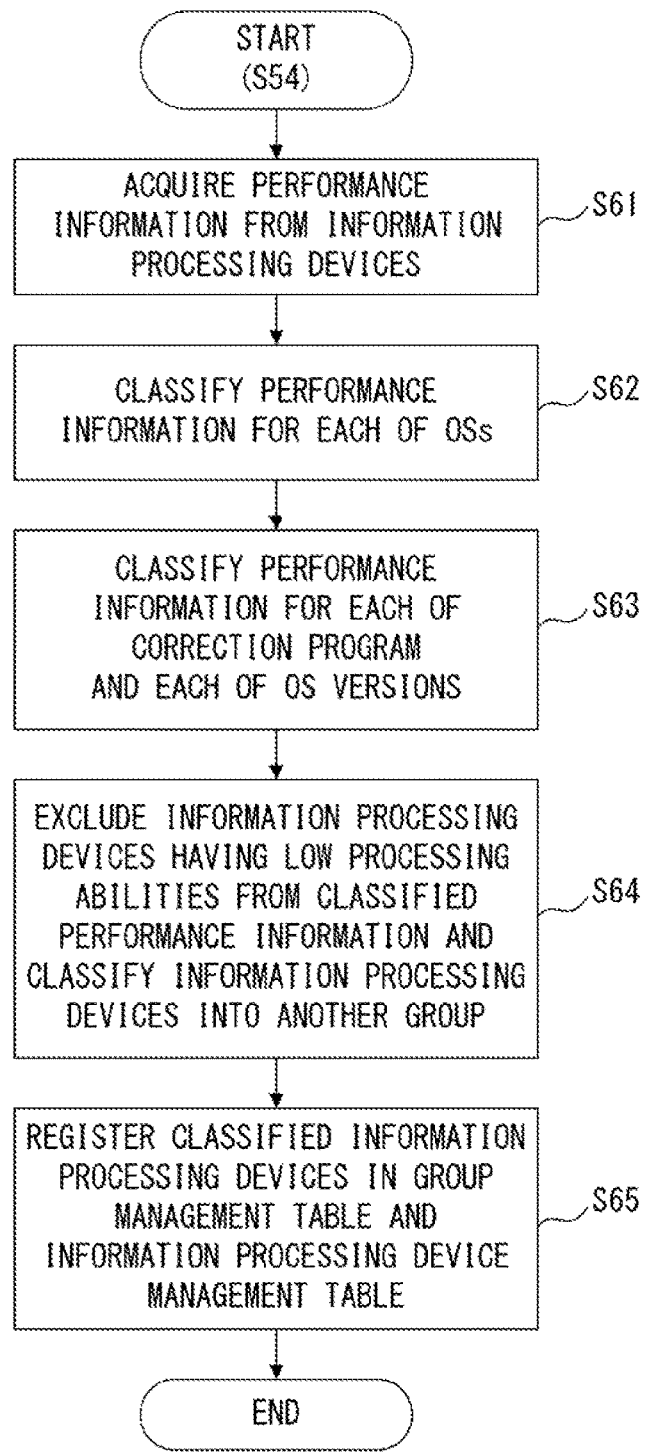
FIG. 19 depicts details of the group classification processing (S54).

FIG. 18 is a diagram for explaining group classification processing. FIG. 19 depicts details of the group classification processing (S54). In the group classification processing in this embodiment, the group classification manually performed in the first embodiment is automatically performed. Specifically, the information processing devices 4 are grouped in the order of (i) OSs, (ii) correction programs and versions of the OSs, and (iii) processing abilities. In the following explanation, the group classification processing depicted in FIG. 19 is explained with reference to FIG. 18.

First, the performance information receiving unit 55 acquires performance information transmitted from the information processing devices 4 (S61). At this point, the performance information receiving unit 55 acquires IP addresses of the information processing devices 4 from the information processing devices 4 as well.

The group classifying unit 56 classifies the performance information of the information processing devices 4 for each of OSs (S62). When information concerning correction program numbers and versions of the OSs is not included in the performance information, as depicted in FIG. 18, groups 141, 143, and 144 are obtained by the classification processing of (i).

Subsequently, the group classifying unit 56 further classifies the performance information of the information processing devices, which is classified for each of the OSs, for each of correction programs and versions of the OSs (S63). Consequently, as depicted in FIG. 18, groups 145 and 146 are obtained by the classification processing of (ii).

Further, the group classifying unit 56 excludes performance information of the information processing devices having low processing abilities from the classified performance information of the information processing devices and groups the excluded performance information of the information processing devices into another group (S64). Consequently, in FIG. 18, the group classifying unit 56 can make the information processing devices having low processing ability independent from the group 143 as a group 142 through the classification processing in (iii).

As a method of excluding performance information of the information processing devices having low processing abilities from the classified performance information of the information processing devices, for example, there is a method of using communication speeds of the information processing devices measured in S51 in FIG. 17. Specifically, for example, the group classifying unit 56 calculates an average $\mu$ and a standard deviation $\sigma$ of the communication speeds of the groups and determines whether the communication speeds are within a range of $\mu \pm \sigma$, $\mu \pm 2\sigma$, or $\mu \pm 3\sigma$. As a result of the determination, the group classifying unit 56 may exclude the information processing devices having communication speeds outside the range from the groups.

As another method of excluding performance information of the information processing devices having low processing abilities from the classified performance information of the information processing devices, for example, a method of using a memory capacity or a hard disk capacity may be adopted. Specifically, for example, the group classifying unit 56 calculates an average $\mu$ and a standard deviation $\sigma$ of memory capacities or hard disk capacities of the information processing devices in the groups and determines whether the capacities are within a range of $\mu \pm \sigma$, $\mu \pm 2\sigma$, or $\mu \pm 3\sigma$. As a result of the determination, the group classifying unit 56 may exclude the information processing devices having communication speeds outside the range from the groups. At this point, the group classifying unit 56 may acquire the memory capacities or the hard disk capacities of the information processing devices from the information processing devices as performance information or acquire the memory capacities or the hard disk capacities from the performance management table 51 using model names as keys.

As another method of excluding performance information of the information processing devices having low processing abilities from the classified performance information of the information processing devices, for example, a method of using the performance management table 51 may be adopted. For example, it is assumed that information indicating that information processing devices have low processing abilities of models is registered in the performance management table 51 in advance. The group classifying unit 56 collates the classified information processing devices with the performance management table 51. As a result of the collation, when the information processing devices are information processing devices having low processing abilities, the group classifying unit 56 may exclude the information processing devices from the groups.

The group classifying unit 56 registers the classified information processing devices in the group management table 53 and the information processing device management table 54 (S65). Specifically, the group classifying unit 56 gives a unique number (group number) to each of the groups formed as a result of the classification. The group classifying unit 56 registers group numbers, OS names, correction program numbers, and versions of the OSs of the grouped performance information in the group management table 53. The group classifying unit 56 registers information processing device numbers and model names of the information processing devices (members) forming the groups, group numbers of the groups to which the information processing devices belong, and IP addresses of the information processing devices in the information processing device management table 54.

Figure 20A:
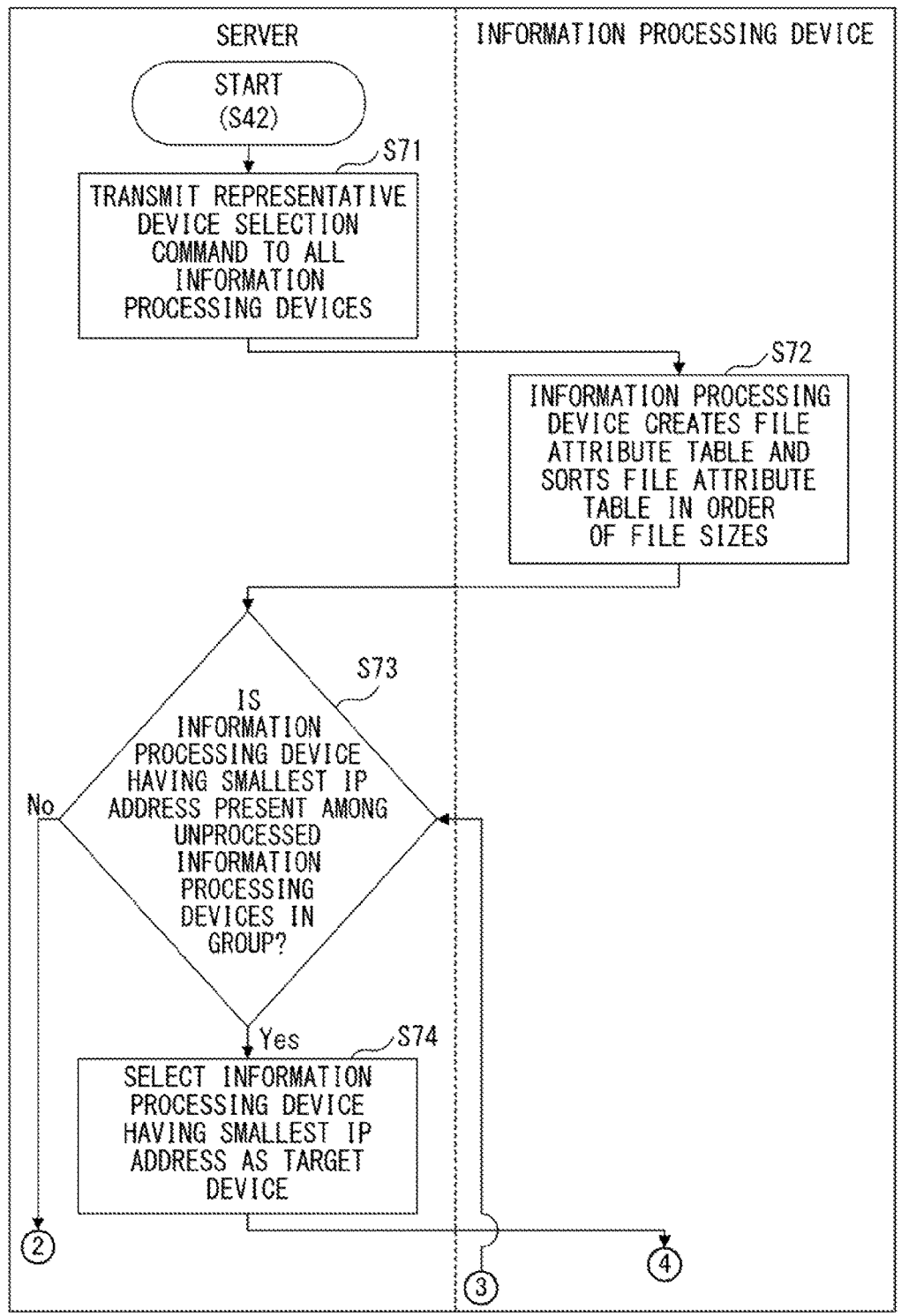
Figure 20B:
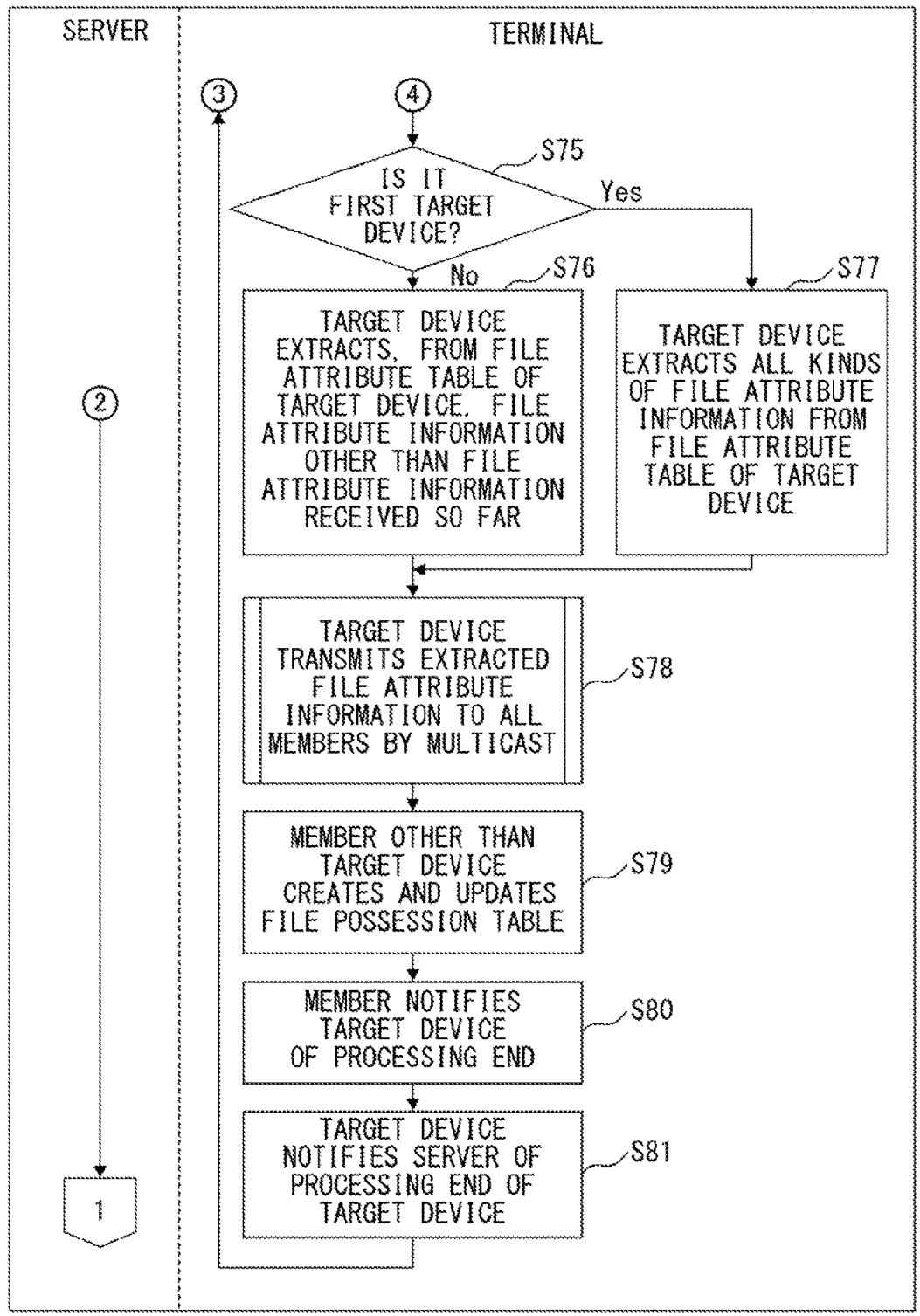

FIGS. 20A, 20B and 20C depict a flow of the representative device selection processing (S42) in the second embodiment. The control unit 15*a* of the server 2 transmits a representative device selection command to all the information processing devices 4 on the network 5 (S71).

When the each of information processing devices 4 receive the representative device selection command, the file attribute table creating unit 64 of the information processing device 4 creates the file attribute table 62 on the basis of the files stored in the storing unit 17. In the file attribute table 62, information indicating attributes of the files (file attribute information) is stored. The file attribute table creating unit 64 sorts the file attribute information of the file attribute table 62 in the order of file sizes (S72).

In the server 2, the control unit 15a receives notifications indicating that the creation of the file attribute tables 62 ends from the information processing devices 4. Then, the control unit 15a sorts, for each of the groups, the information processing device information of the information processing device management tables 54 in order from one having a smallest IP address.

The control unit 15a determines whether information processing devices having the smallest IP address are present among unprocessed information processing devices in the groups (S73). The unprocessed information processing devices mean information processing devices not subjected to the processing in S75 to S81. When the information processing device having the smallest IP address is present among the unprocessed information processing devices, the control unit 15a selects, for each of the groups, the information processing device 4 having the smallest IP address as a processing target information processing device (a target device) (S74). The control unit 15a notifies the information processing device selected for each of the groups that the information processing device is the target device and notifies the information processing device of a multicast address of the group to which the target device belongs. At this point, when the selected target device is a k-th (k is an integer) target device in the group, the control unit 15a also notifies the target device that the target device is the k-th target device.

The target device receives the notification indicating that the target device is the k-th target device in the group and indicating the multicast address of the group to which the target device belongs. At this point, when the selected target device is the first (k=1) target device in the group ("Yes" in S75), the file attribute sharing unit 65 of the target device extracts all kinds of file attribute information from the file attribute table 62 of the target device (S77).

In S75, when the selected target device is the second or subsequent (k≥2) target device ("No" in S75), the file attribute sharing unit 65 of the target device performs processing explained below. The file attribute sharing unit 65 of the target device extracts, from the file attribute table 62 of the target device, file attribute information different from files of the other members received so far (S76).

Subsequently, the file attribute sharing unit 65 of the target device transmits the file attribute information extracted in S76 and S77 to all the members in the group by multicast using the notified multicast address (S78). In multicast transmission processing, multicast transmission is performed according to a flow same as that of the processing explained with reference to FIG. 8. At this point, since the target device is also a member of the multicast address, the file attribute information transmitted by the target device is transmitted to the target device as well. However, for example, the file attribute information transmitted to the target device may be deleted after reception. Processing explained below may be performed before the multicast transmission is performed. The target device transmits secession request information to the switch 3 using IGMP and temporarily secede from the members of the multicast address. After the multicast transmission, the target device transmits participation request information (join) in the group of the multicast address, from which the target device secedes to the switch 3, using IGMP. Consequently, the target device may participate in the group again. For example, when a filter function of a transmission source by IGMP can be used, the filter function may be set such that the multicast transmission cannot be received when a transmission source of the multicast transmission is the target device itself.

Subsequently, the file possession determining unit 66 of each of the members other than the target device creates the file possession tables 63 (S79). First, the file possession determining unit 66 registers, in the file possession table 63, file names and file sizes of file attribute information included in the file attribute tables 62 of the members created by the members themselves. The file possession determining unit 66 registers "O" in the "possession flag" 133 corresponding to the registered file attribute information in the file possession table 63.

The file possession determining unit 66 compares the file attribute information included in the file attribute table 62 created by the member itself and the file attribute information of the other members received in S78. Specifically, the file possession determining unit 66 compares the file name, the file size, the update date, and the CRC value of the respective kinds of file attribute information. As a result of the comparison, when the respective kinds of file attribute information do not coincide with each other, i.e., when the received file attribute information of the other members is not included in the file attribute table 62 of the member, the file possession determining unit 66 performs processing explained below. The file possession determining unit 66 registers, in the file possession table 63, the file name and the file size of the file attribute information not included in the file attribute table 62 and register "X" in the "possession flag" 133. On the other hand, as a result of the comparison, when the respective kinds of file attribute information coincide with each other, the received attribute information of the other members is already present in the file attribute table 62 of the member. At this point, in the file possession table 63, the file name, the file size, and the possession flag of the file attribute information are already registered as well. Processing in S79 is explained in detail with reference to FIGS. 21A, 21B and 21C.

The file possession determining unit 66 of each of the members notifies the target device of the end of creation processing for the file possession table 63 (S80). When the target device receives the notifications in S80 from all the members in the group, the target device notifies the server 2 of the end of the processing of the target device (S81).

Then, in the server 2, the control unit 15a performs the processing in S73 and S74. The processing in S75 to S81 is repeatedly performed in all the members in the group. The processing in S79 is explained below.

Figure 21A:
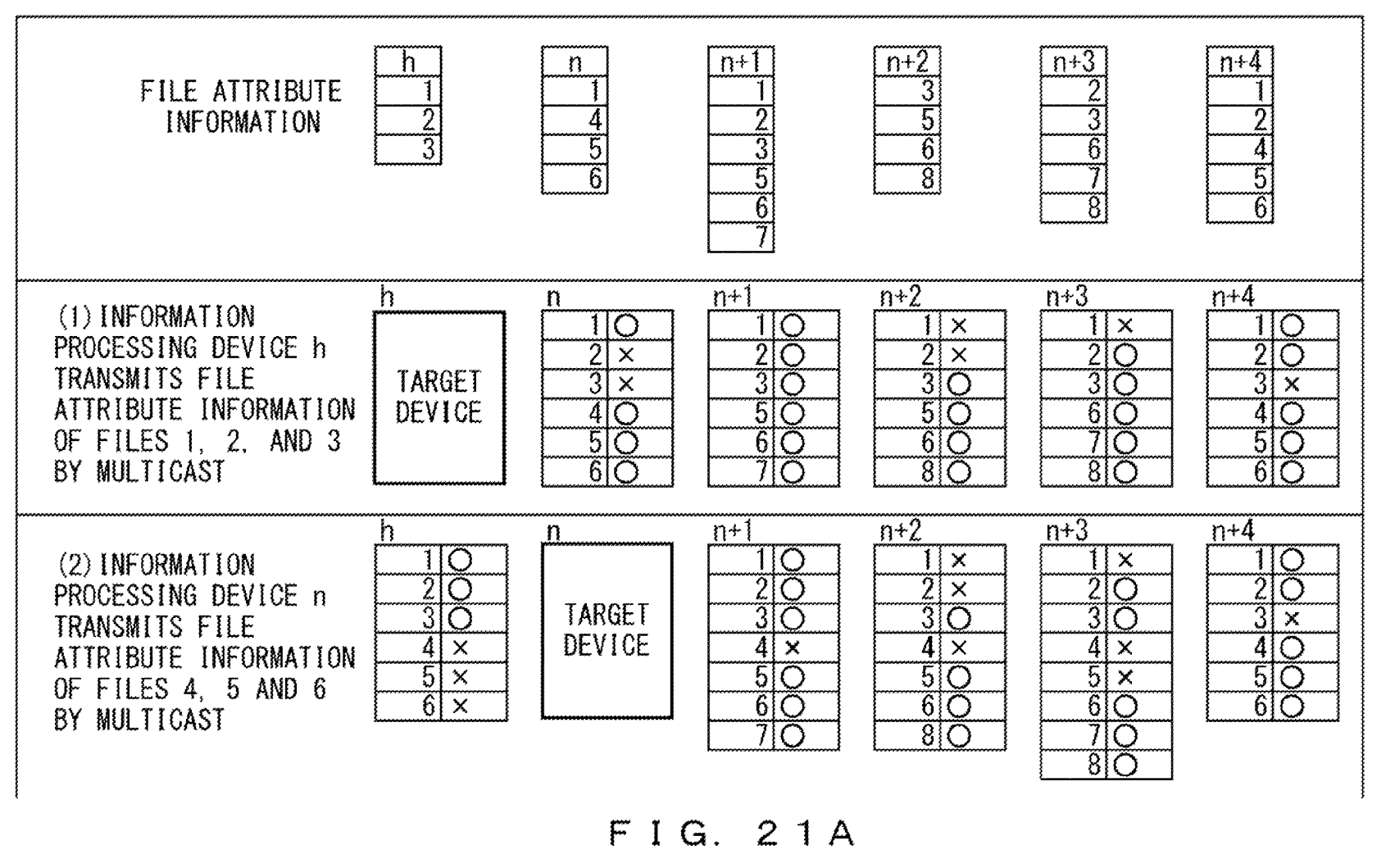
Figure 21B:
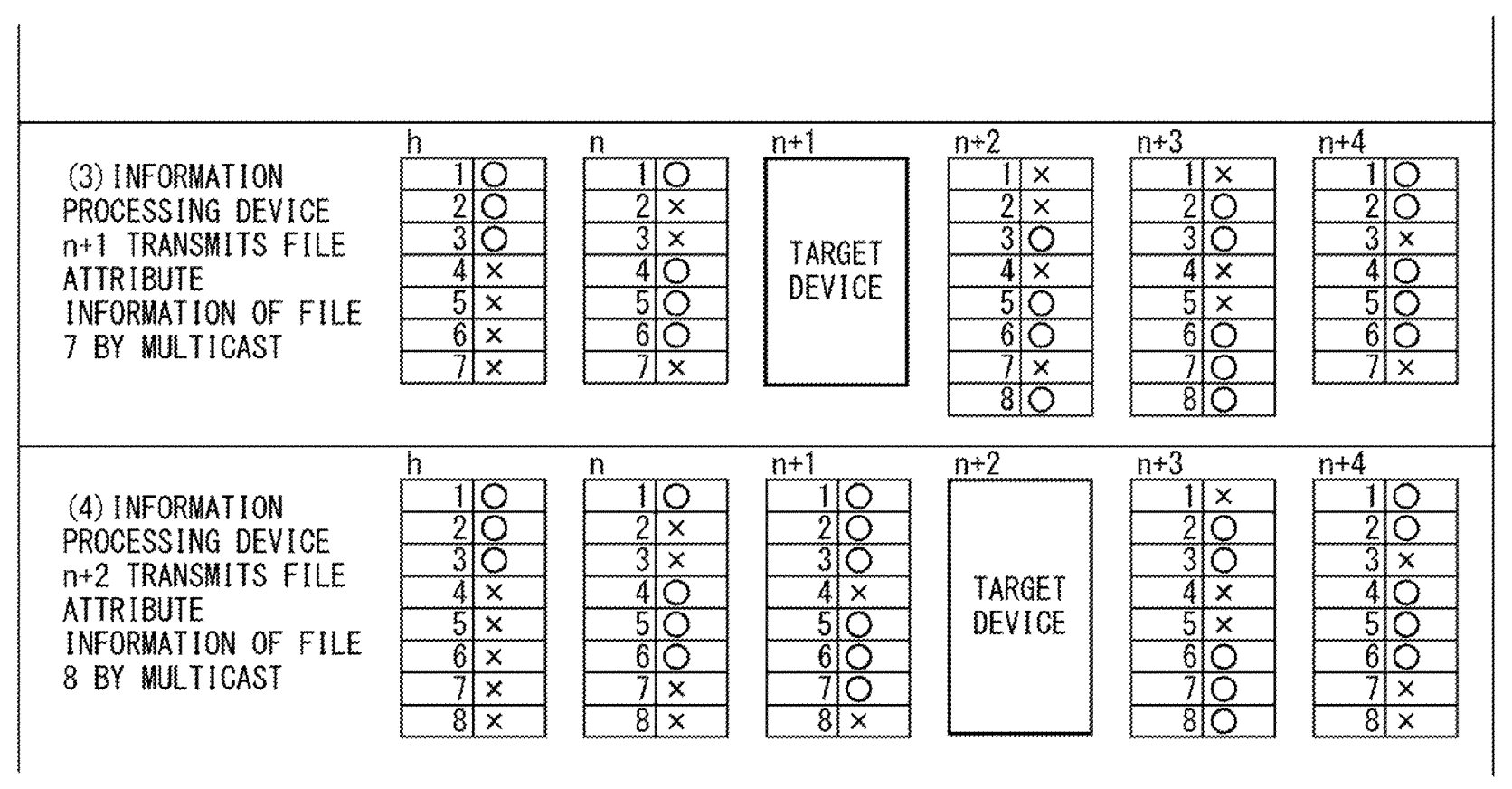

FIGS. 21A, 21B and 21C are a diagram for explaining creation and update of the file possession tables of the members in the second embodiment. File attribute information (only file names are displayed for convenience of explanation) of information processing devices h, n, n+1, n+2, n+3, and n+4, which are the members in the group, is depicted at the top of FIGS. 21A, 21. The information processing device h has file attribute information of "file 1", "file 2", and "file 3". The information processing device n has file attribute information of "file 1", "file 4", "file 5", and "file 6". The information processing device n+1 has file attribute information of "file 1", "file 2", "file 3", "file 5", "file 6", and "file 7". The information processing device n+2 has file attribute information of "file 3", "file 5", "file 6", and "file 8". The information processing device n+3 has file attribute information of "file 2", "file 3", "file 6", "file 7", and "file 8". The information processing device n+4 has file attribute information of "file 1", "file 2", "file 4", "file 5", and "file 6".

In FIGS. 21A, 21B and 21C, (1) to (6) indicate processes of creation and update of the file possession tables 63 of the members in the group. For convenience of explanation, in the file possession table 63, only file names (only numbers) and possession flags are displayed. The information processing devices take charge of the target device in the order of h, n, n+1, n+2, n+3, and n+4.

First, as depicted in (1) of FIG. 21A, when the information processing device h is the target device, the target device h extracts the file attribute information of all the files 1, 2, and 3 from the file attribute table of the target device h and transmits the extracted file attribute information of the files 1, 2, and 3 by multicast. Then, for example, the information processing device n sets the possession flag of the file possession table 63 to "O" concerning the files 1, 4, 5, and 6 possessed by the information processing device n. The information processing device n adds records to the file possession table 63 concerning the files 3 and 4 not possessed by the information processing device n among the file attribute information of the files 1, 2, and 3 received from the target device h and sets the possession flag of the file possession table 63 to "X". The other information processing devices n+1, n+2, n+3, and n+4 perform the processing in the same manner.

Subsequently, as depicted in (2) of FIG. 21A, when the information processing device n is the target device, the target device n performs processing explained below. The target device n extracts the file attribute information of the files 4, 5, and 6 which is file attribute information different from the file attribute information (the files 1 to 3) of the other members received so far, from the file attribute table 62 of the target device n. The target device n transmits the extracted file attribute information of the files 4, 5, and 6 by multicast. Then, for example, the information processing device n+1 adds a record to the file possession table 63 concerning the file 4 not possessed by the information processing device n+1 among the file attribute information of the files 4, 5, and 6 received from the target device n and sets the possession flag of the file possession table 63 to "X". The other information processing devices h, n+2, n+3, and n+4 perform the processing in the same manner. Concerning the information processing device h, which is the target device last time, the file possession table 63 is not created. Therefore, the file possession table 63 for the information processing device his created anew this time.

Subsequently, as depicted in (3) of FIG. 21B, when the information processing device n+1 is the target device, the target device n+1 performs processing explained below. The target device n+1 extracts the file attribute information of the file 7, which is file attribute information different from the file attribute information (the files 1 to 6) of the other members received so far, from the file attribute table 62 of the target device n+1. The target device n+1 transmits the extracted file attribute information of the file 7 by multicast. Then, for example, since the information processing device n+2 does not possess the file attribute information of the file 7 received from the target device n+1, the information processing device n+2 adds a record to the file possession table 63 concerning the file 7 and sets the possession flag of the file possession table 63 to "X". The other information processing devices h, n, n+3, and n+4 perform the processing in the same manner.

Subsequently, as depicted in (4) of FIG. 21B, when the information processing device n+2 is the target device, the target device n+2 performs processing explained below. The target device n+2 extracts the file attribute information of the file 8, which is file attribute information different from the file attribute information (the files 1 to 7) of the other members received so far, from the file attribute table 62 of the target device n+2. The target device n+2 transmits the extracted file attribute information of the file 8 by multicast. Then, for example, since the information processing device n+3 possesses the file attribute information of the file 8 received from the target device n+1, the information processing device n+3 does not perform update of the file possession table 63. The other information processing devices h, n, n+1, and n+4 perform the processing in the same manner.

Subsequently, as depicted in (5) of FIG. 21C, when the information processing devices n+3 and n+4 are respectively the target devices, none of the file attribute information possessed by the information processing devices n+3 and n+4 is different from the file attribute information received so far. Therefore, the target devices n+3 and n+4 do not perform transmission of the file attribute information of the target devices n+3 and n+4.

After all the members in the group as the target devices end the processing, the file possession tables 63 of the members are updated as depicted in (6) of FIG. 21C. FIGS. 20A, 20B and 20C are referred to again.

In the group, when there is no unprocessed information processing device ("No" in S73), the control unit 15a transmits request information to all the information processing devices 4 to request the information processing devices 4 to transmit the file possession tables 63 of the information processing devices 4 (S82). When the file possession table transmitting unit 67 of each of the information processing devices 4 receives the request information, the file possession table transmitting unit 67 transmits the file possession table 63 to the server (S83).

The file possession table receiving unit 57 of the server 2 receives the file possession tables 63 transmitted from the information processing devices 4. The representative device determining unit 58 creates the representative device determination table 52 for each of the groups from the file possession tables 63 transmitted from the information processing devices 4 (S84). For example, when the file possession table 63 transmitted from a member of a certain group includes content depicted in (6) of FIG. 21C, the representative device determining unit 58 performs processing explained below. The representative device determining unit 58 combines the file possession tables 63 transmitted from the information processing devices 4 using file names and generates the representative device determination table 52 depicted in FIG. 11.

At this point, in the "file name" 91a of the representative device determination table 52, file names of the file attribute information shared in the group are stored. In the "file size" 91b, file sizes corresponding to the files stored in the "file name" 91a are stored. In the "information processing device name (member)" 92, information processing device names of the members in the group and content of the "possession flag" 133 of the file possession tables 63 transmitted from the information processing devices are stored in association with the file names.

In the "number of possessing information processing devices" 93, the number of information processing devices that possess the files are stored. For example, concerning the file 1, when the number of "O" of the possession flags is counted, four information processing devices indicated by h, n, n+1, an n+4 have the file 1. Therefore, "4" is stored in the "number of possessing information processing devices" 93.

In the "file size×number of possessing information processing devices" 94, a value obtained by multiplying a value stored in the "file size" 91b with a value stored in the "number of possessing information processing devices" 93 is stored.

Subsequently, the representative device determining unit 58 determines a representative device using the representative device determination table 52 (S85). The determination is explained with reference to FIG. 22.

After the determination of the representative device, even if the representative device transmits the basic image by multicast in the processing in S5 in FIG. 16, specifically, S14 in FIGS. 7A and 7B, the control unit 15a may take measures such that the basic image is not transmitted to the control unit 15a. Specifically, as explained in the first embodiment, the control unit 15a may transmit secession request information to the switch 3 using IGMP and transmit command information to the information processing device determined as the target device to instruct the information processing device to secede from the members of the multicast address. However, when the filter function for a transmission source by IGMP is used in S14 in FIGS. 7A and 7B, the information processing device determined as the representative device does not have to secede from the members of the multicast address. In other words, when the transmission source of the multicast transmission is the representative device itself in S14 in FIGS. 7A and 7B, the control unit 15a may disable reception using the filter function for the transmission source by IGMP. The control unit 15a may dynamically allocate multicast addresses to the members of the groups using MADCAP on the basis of the group management table 53 and the information processing device management table 54.

Consequently, the processing in S42 ends.

FIG. 22 is a diagram for explaining a method of determining a representative device using the representative device determination table 52 in the second embodiment. A file name is represented by i, a file size is represented by $s_i$, a member (an information processing device) in a group is represented by j, and the number of possessing information processing devices is represented by $r_i$. The possession flag in the "information processing device name (member)" 92 is represented by $B_{ij}$ as indicated by Expression 1.

$$B_{ij} = \begin{cases} 0, & \text{(in the case of "X")} \\ 1, & \text{(in the case of "O")} \end{cases} \quad (1)$$

Then, a total amount of backup data is represented by Expression (2). In the expression (2), "m" indicates the number of members.

$$\sum_{i=1}^{m}(1-B_{ij})s_i r_i + \sum_{i=1}^{m} B_{ij} s_i \quad (2)$$

The term in the former half of Expression (2) indicates, for example, in the case of j=n+4, a total of file sizes in portions surrounded by broken lines on the representative device determination table 52 in FIG. 22. The term in the latter half of Expression (2) indicates, for example, in the case of j=n+4, a total of file sizes in portions surrounded by solid lines on the representative device determination table 52 in FIG. 22.

When Expression (2) is expanded, Expression (3) is obtained.

$$= \sum_{i=1}^{m} s_i r_i - \sum_{i=1}^{m} B_{ij} s_i r_i + \sum_{i=1}^{m} B_{ij} s_i \quad (3)$$

$$= \sum_{i=1}^{m} s_i r_i - \sum_{i=1}^{m} B_{ij} s_i (r_i - 1)$$

The term in the former half of Expression (3) indicates a data total amount T of all files when backed up. The term in the latter half of Expression (3) indicates a data total amount (a redundant data total amount Dj) of files redundant among the members. If Dj is the maximum, the total backup data amount is the minimum. Therefore, j that maximizes Dj is optimum as a representative device. For example, in the representative device determination table 52 in FIG. 22, an information processing device having a maximum redundant data total amount $D_{n+4}$ of 147 is an information processing device (n+4). Therefore, the representative device determining unit 58 selects the information processing device (n+4) as a representative device.

In this way, all the kinds of file attribute information possessed by the members are transmitted by multicast among the members and shared among the members. The members perform processing for determining which files are files possessed by the members among the shared file attribute information. The server can acquire a result of the determination from the members and, when backup data of all the members are totaled, determine a representative device having a largest amount of redundant data. The processing in S42 is desirably performed in, for example, a time frame when the information processing devices 4 are not used.

Figure 23:
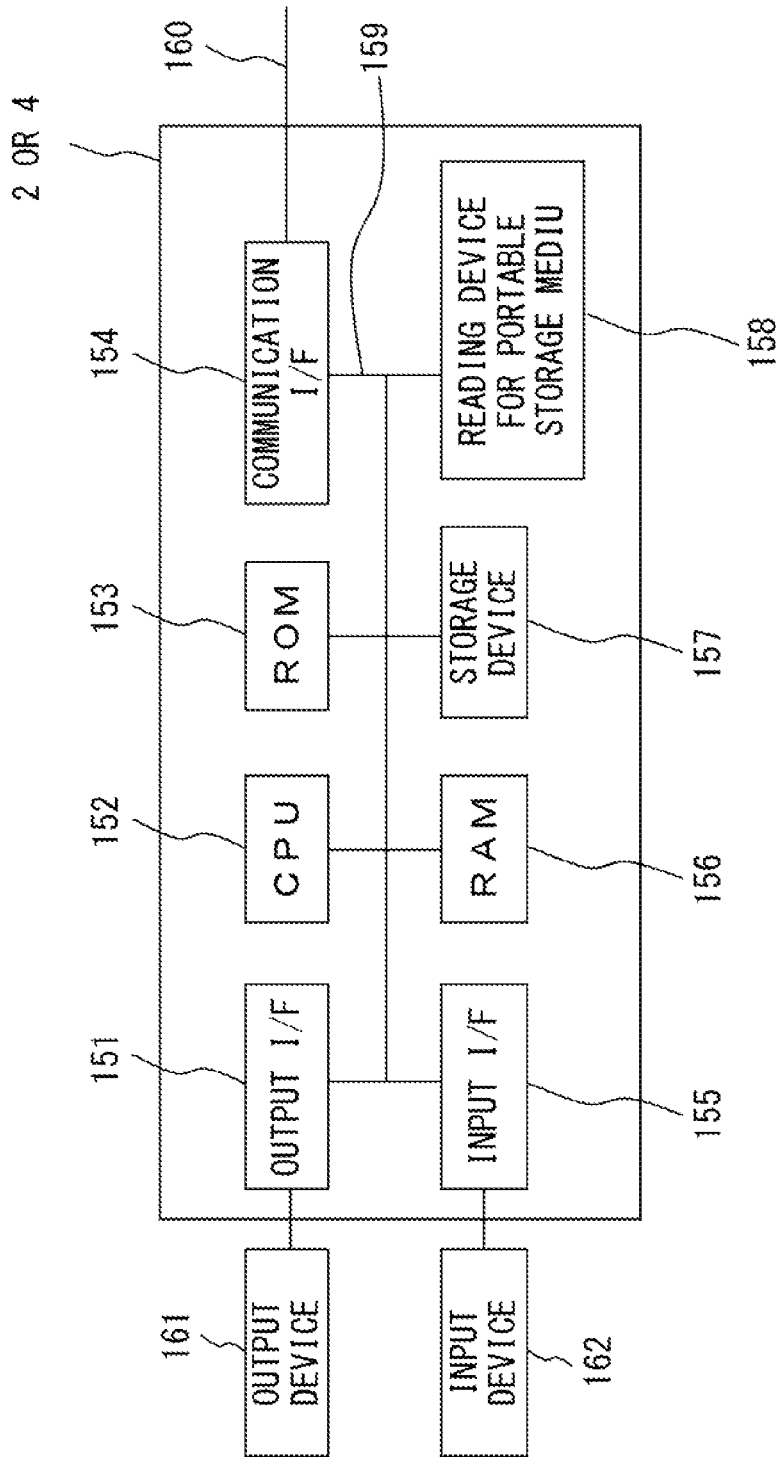
FIG. 23 is a configuration block diagram of a hardware environment of a server 2 or an information processing device 4.

FIG. 23 is a configuration block diagram of a hardware environment of the server 2 or the information processing device 4. The server 2 or the information processing device 4 includes a CPU 152, a ROM 153, a RAM 156, a communication I/F 154, a storage device 157, an output I/F 151, an input I/F 155, a reading device 158, a bus 159, an output device 161, and an input device 162.

The CPU indicates a central processing unit. The ROM indicates a read only memory. The RAM indicates a random access memory. The I/F indicates an interface. The CPU 152, the ROM 153, the RAM 156, the communication I/F 154, the storage device 157, the output I/F 151, the input I/F 155, and the reading device 158 are connected to the bus 159. The reading device 158 is a device that reads a portable recording medium. The output device 161 is connected to the output I/F 151. The input device 162 is connected to the input I/F 155.

As the storage device 157, storage devices of various forms such as a hard disk drive, a flash memory device, a magnetic disk device can be used.

In the storage device 157 or the ROM 153, for example, a program on the server 2 side or a program on the information processing device 4 side for realizing the processing explained in the first or second embodiment is stored. The storage device 157 or the ROM 153 functioning as the storing unit 11 includes the image storage area 12, the performance management table 51, the representative device determination table 52, the group management table 53, and the information processing device management table 54. The storage device 157 or the ROM 153 functioning as the storing unit 17 includes the image storage area 61, the file attribute table 62, and the file possession table 63, and files.

The CPU 152 reads out the program for realizing the processing explained in the first or second embodiment stored in the storage device 157 or the like and executes the program. Specifically, the CPU 152 executes the program to thereby function as the control units 15, 15a, 18, and 18a.

The program for realizing the processing explained in the first or second embodiment may be stored in, for example, the storage device 157 from a program provider side via a communication network 160 and the communication I/F 154. The program for realizing the processing explained in the first or second embodiment may be stored in a portable storage medium sold in the market and circulated. In this case, the portable storage medium may be set in the reading device 158. The program may be read out and executed by the CPU 152. As the portable storage medium, storage media of various forms such as a CD-ROM, a flexible disk, an optical disk, a magneto-optical disk, an IC card, and a USB memory device can be used. The program stored in such a storage medium is read by the reading device 158.

As the input device 162, a keyboard, a mouse, an electronic camera, a web camera, a microphone, a scanner, a sensor, a tablet, a touch panel, and the like can be used. As the output device 161, a display, a printer, a speaker, and the like can be used. The network 160 may be a communication network such as the Internet, a LAN, a WAN, a leased line, a wire, or radio.

According to the second embodiment, in addition to the effects of the first embodiment, effects explained below can be further obtained. Since the information processing device having the maximum redundant data total amount Dj in the group is selected as the representative device, a total amount of backup data in the backup system 1 as a whole is reduced. As a result, the backup system 1 can reduce a data transmission quantity for backup data transmission. Since a data amount transmitted to the server 2 and a data amount stored by the server 2 are reduced, a load of processing of the server 2 is reduced. Therefore, it is possible to reduce a load concentrated on the server 2. Since transfer of common data is further made unnecessary among plural information processing devices, it is possible to reduce time necessary for backup of all the information processing devices.

According to the above explanation, a backup program for causing two or more information processing devices connected to an information processing apparatus via a network to execute backup of file data stored in storing units by the information processing devices causes the information processing device to execute processing explained below. When the information processing device is designated as the first device among plural information processing devices, as depicted in S13 as an example, the first device transmits the first backup image concerning all file data stored in a storing unit of the first device to the information processing apparatus. At the same time, as depicted in S14 as an example, the first device transmits the first backup image to the second device, which is the information processing device other than the first device. When the information processing device is the second device, as depicted in S17 as an example, the second device acquires a difference image. The difference image is a difference between the first backup image transmitted from the first device and the second backup image concerning all file data stored in a storing unit of the second device. As depicted in S18 as an example, the second device transmits the difference image to the information processing apparatus.

With such a configuration, it is possible to reduce loads on the server and the network and time required for entire backup processing.

The backup program further causes the information processing device to execute processing explained below. As depicted in S72 as an example, the information processing device acquires attribute information of all file data stored in the storing unit. As depicted in S78 as an example, the information processing device transmits the attribute information of all the file data to the other information processing devices. At the same time, as depicted in S78 as an example, the information processing device receives attribute information of all file data stored in storing units of the other information processing devices. Consequently, the information processing devices share the attribute information of the file data among the information processing devices. As depicted in S79 as an example, the information processing device determines which file data is possessed by the information processing device itself among file data corresponding to the shared attribute information of the file data. As depicted in S83 as an example, the information processing device transmits a result of the determination to the information processing apparatus.

With such a configuration, it is possible to transmit a file possession table to the server.

In the transmission of the first backup image, when the information processing device is designated as the first information processing device among plural information processing devices classified into an arbitrary group, as depicted in S13 to S14 as an example, the first device performs processing explained below. The first information processing device transmits the first backup image concerning all file data stored in a storing unit to the information processing apparatus. At the same time, the first information processing device transmits the first backup image to the second information processing device, which is an information processing apparatus other than the first device, classified into a group identical to the group.

A backup program for causing an information processing apparatus connected to the information processing devices via a network to execute control processing for backup of file data of the information processing devices causes the information processing apparatus to execute processing explained below.

As depicted in S84 as an example, the information processing apparatus receives determination results from the information processing devices. The determination results are results obtained by determining which data are possessed by the information processing devices among file data corresponding to attribute information of file data transmitted and received and shared among the information processing devices in the group. As depicted in S84 to S85 as an example, the information processing apparatus determines, using the received determination results, any one of the information processing devices in the group as the first device according to a data amount of file data redundantly possessed in the group. As depicted in S13 as an example, the information processing apparatus receives the first backup image concerning all file data stored in a storing unit of the first device. Further, as depicted in S19 as an example, the information processing apparatus receives a difference image from the second device, which is an information processing apparatus other than the first device, classified into the group to which the first device belongs. The difference image is a difference between the first backup image transmitted from the first device to the second device and the second backup image concerning all file data stored in a storing unit of the second device. As depicted in S19 as an example, the information processing apparatus stores the first backup image and the difference image in the storing unit.

With such a configuration, it is possible to reduce loads on the server and the network, a data amount of entire backup, and time required for entire backup processing.

As depicted in S54 (S61) as an example, the information processing apparatus acquires performance information of the information processing devices from the information processing devices. As depicted in S54 (S62 to S64) as an example, the information processing apparatus classifies the information processing devices into groups according to the performance information. The performance information includes information concerning types of operating systems used in the information processing devices, versions of the operating systems, and versions of correction programs of the operating systems. As depicted in S62 to S63 as an example, the information processing apparatus classifies the information processing devices into groups on the basis of the information concerning the types of the operating systems, the versions of the operating systems, and the versions of the correction programs of the operating systems.

With such a configuration, it is possible to classify the information processing devices into groups according to processing abilities of the information processing devices.

In classifying the information processing devices into groups, as depicted in S64 as an example, the information processing apparatus further classifies the classified information processing devices according to communication speeds.

With such a configuration, it is possible to exclude performance information of the information processing devices having low processing abilities from the performance information of the classified information processing devices and classify the information processing devices corresponding to the excluded performance information into another group.

As depicted in S85 as an example, the information processing apparatus determines, using determination results received from the information processing devices, the information processing device having a largest data amount of possessed files among file data redundantly possessed by the information processing devices in the group as the first device.

With such a configuration, it is possible to determine a representative device having a largest amount of redundant data when backup data of all members are totaled. Consequently, when differential backup is performed in a group unit, it is possible to minimize a total backup data amount in the group.

By using the backup system explained in this specification, it is possible to reduce loads on the server and the network and time required for entire backup processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A backup method for a backup system including an information processing apparatus and two or more information processing devices connected via a network, the backup method comprising:
   transmitting, by a first device among the plurality of information processing devices, a first backup image for all first file data stored in a storing unit of the first device to the information processing apparatus and transmitting the first backup image to a second device, the second device being an information processing device other than the first device among the plurality of information processing devices; and
   extracting a difference image and transmitting the difference image to the information processing apparatus by the second device, the difference image being a difference between the first backup image transmitted from the first device and a second backup image for all second file data stored in a storing unit of the second device,
   the plurality of information processing devices are classified into a plurality of groups,
   the first device transmits, in the transmission of the first backup image, the first backup image for all the first file data stored in the storing unit of the first device to the information processing apparatus and transmits the first backup image to the second device that belongs to the same group as a group to which the first device belongs, and
   the information processing apparatus performs processes of:
      receiving, from the information processing devices, a determination result obtained by determining whether each of pieces of file data is possessed by the information processing devices, attribute information of the file data being transmitted and being received and being shared among the information processing devices each belongings to one of the plurality of groups;
      determining, using the received determination results, an information processing device having a largest data amount of redundantly possessed file data among the information processing devices in the one of the plurality of groups as the first device, the redundantly possessed file data being redundantly possessed by the information processing devices in the one of the plurality of groups;
      receiving the first backup image for all the first file data stored in the storing unit of the first device;
      receiving the difference image from the second device which is classified into the one of the plurality of groups; and
      storing the received first backup image and the received difference image in a storing unit of the information processing apparatus.

2. The backup method according to claim 1, wherein the information processing device performs processes of:
   acquiring first attribute information of all file data stored in the storing unit of the first device and the storing unit of the second device;
   transmitting the first attribute information of all the file data to another information processing device, and receiving second attribute information of all file data stored in a storing unit of the another information processing device, thereby sharing all attribute information of all the file data among the information processing devices;

determining whether the each of pieces of the file data is possessed by the information processing device itself; and transmitting a result of the determination to the information processing apparatus.

3. The backup method according to claim 1, wherein the information processing apparatus performs processes of:

acquiring performance information of the information processing devices from the information processing devices, the performing information including information indicating a type of an operating system used in the information processing device, a version of the operating system, and a version of a correction program of the operating system; and classifying the information processing device into groups according to the performance information, wherein in the classifying the information processing devices into the groups, the information processing apparatus classifies the information processing devices into groups using the information indicating the type of the operating system, the version of the operating system, and the version of the correction program of the operating system.

4. The backup method according to claim 3, wherein, in the classifying the information processing devices into the groups, the information processing apparatus further classifies the classified information processing devices according to communication speeds.

* * * * *